(12) United States Patent
Hayata

(10) Patent No.: US 8,807,728 B2
(45) Date of Patent: Aug. 19, 2014

(54) INKJET RECORDING METHOD

(75) Inventor: Yuuichi Hayata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 422 days.

(21) Appl. No.: 13/238,971

(22) Filed: Sep. 21, 2011

(65) Prior Publication Data

US 2012/0069082 A1      Mar. 22, 2012

(30) Foreign Application Priority Data

Sep. 22, 2010  (JP) ................................ 2010-212608

(51) Int. Cl.
| | | |
|---|---|---|
| *B41J 2/01* | (2006.01) | |
| *B41J 2/21* | (2006.01) | |
| *C09D 11/00* | (2014.01) | |
| *B41M 5/00* | (2006.01) | |
| *C09D 11/10* | (2014.01) | |
| *B41M 7/00* | (2006.01) | |

(52) U.S. Cl.
CPC ............ *B41M 5/0023* (2013.01); *B41J 2/2107* (2013.01); *C09D 11/322* (2013.01); *B41M 5/0011* (2013.01); *C09D 11/101* (2013.01); *B41J 2/01* (2013.01); *B41M 7/0081* (2013.01); *C09D 11/40* (2013.01)
USPC .............. 347/100; 347/95; 347/102; 347/101

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ............. 347/100, 95, 96, 21, 102, 101, 20, 9, 347/88, 99, 103, 105; 106/31.6, 31.27, 106/31.13; 523/160, 161
See application file for complete search history.

(56) References Cited

U.S. PATENT DOCUMENTS

| | | | |
|---|---|---|---|
| 2004/0141040 A1 | 7/2004 | Nakajima | |
| 2009/0214797 A1* | 8/2009 | Kasai | ............................ 427/511 |
| 2009/0244116 A1* | 10/2009 | Ohnishi | ............................ 347/6 |
| 2012/0026235 A1* | 2/2012 | Hayata | ............................ 347/20 |
| 2013/0016166 A1* | 1/2013 | Hayata | .......................... 347/102 |

FOREIGN PATENT DOCUMENTS

| | | | |
|---|---|---|---|
| JP | 2003-191593 A | 7/2003 | |
| JP | 2003-211651 A | 7/2003 | |
| JP | 2004-216681 A | 8/2004 | |
| JP | 2009-221416 A | 10/2009 | |
| JP | 2009221416 A * | 10/2009 | ................ B41J 2/01 |

OTHER PUBLICATIONS

European Search Report dated Jan. 26, 2012.

\* cited by examiner

*Primary Examiner* — Manish S Shah
(74) *Attorney, Agent, or Firm* — Sughrue Mion, PLLC

(57) ABSTRACT

An inkjet recording method is provided in which image formation is carried out by employing an ink set, the inks of each color including a polymerizable compound and a polymerization initiator, and discharge of the inks being repeated 2 to 16 times for the same area.

18 Claims, 3 Drawing Sheets

INKJET RECORDING METHOD

BACKGROUND OF THE INVENTION

1. Field of the Invention

The present invention relates to an inkjet recording method.

2. Description of the Related Art

As image recording methods for forming an image on a recording medium such as paper based on an image data signal, there are an electrophotographic system, sublimation type and melt type thermal transfer systems, an inkjet system, etc.

With regard to the inkjet system, the printing equipment is inexpensive, it is not necessary to use a plate when printing, and since an image is formed directly on a recording medium by discharging an ink composition only on a required image area, the ink composition can be used efficiently and the running cost is low, particularly in the case of small lot production. Furthermore, there is little noise and it is excellent as an image recording system, and has been attracting attention in recent years.

Among them, an inkjet recording ink composition (radiation-curing inkjet recording ink composition), which is curable upon exposure to radiation such as UV rays, is an excellent system from the viewpoint of it being possible to print on various types of recording media because, compared with a solvent-based ink composition, the drying properties are excellent and an image is resistant to spreading since the majority of the components in the ink composition cure upon exposure to radiation such as UV rays.

Furthermore, as conventional inkjet recording methods, those below are known.

JP-A-2003-191593 (JP-A denotes a Japanese unexamined patent application publication) describes an image formation method that involves discharging onto a recording medium an ink that cures upon irradiation with actinic radiation, wherein after the ink is discharged, irradiation with actinic radiation is carried out by two or more irradiation means for which at least one of irradiation timing, irradiation intensity, spectral wavelength, and irradiation time is varied.

JP-A-2003-211651 describes an inkjet recording method in which after a radiation-curing type ink is discharged onto a recording material surface, the surface gloss of an image formation part is adjusted by controlling the amount of energy of radiation for curing the landed ink.

Furthermore, JP-A-2004-216681 describes an image formation method in which an actinic radiation-curing type ink is discharged onto a recording material by inkjet recording, wherein after the actinic radiation-curing type ink lands on the recording material, irradiation with actinic radiation is carried out by two or more irradiation means, and the degree of curing (percentage conversion of photopolymerizable compound in actinic radiation-curing type ink) of the actinic radiation-curing type ink by first actinic radiation that is applied first after landing is 6% to 70%.

DISCLOSURE OF INVENTION

Problems to be Solved by the Invention

It is an object of the present invention to provide an inkjet recording method that can give a printed material having inconspicuous stripe unevenness and excellent surface gloss, curability, and flexibility.

Means for Solving the Problems

The object of the present invention has been achieved by means described in <1>. It is described below together with <2> to <13>, which are preferred embodiments.

<1> An inkjet recording method in which image formation is carried out by employing an ink set comprising at least a cyan ink, a magenta ink, a yellow ink, and a black ink, the inks of each color comprising a polymerizable compound and a polymerization initiator, the polymerizable compound in the inks of each color comprising (Component A) at least one type of polymerizable compound selected from the group consisting of an N-vinyllactam, a compound represented by Formula (1), and a compound represented by Formula (2), and (Component B) at least one type of polymerizable compound selected from the group consisting of a compound represented by Formula (3) and a compound represented by Formula (4), the total content of Component A and Component B in the inks of each color being 55 to 85 wt % relative to the entire weight of the ink, and discharge of the inks being repeated 2 to 16 times for the same area, the method comprising at least (1) a step of discharging an ink via an inkjet head, (2) a step of irradiating the discharged ink with actinic radiation by exposure means having an illumination intensity of at least 50 mW/cm² but less than 500 mW/cm² at a time between 0 and 1.0 second after ink discharge so that the integrated exposure for a wavelength region of 240 to 400 nm is no greater than 40 mJ/cm², and (3) a step of irradiating the discharged ink with actinic radiation by exposure means having an illumination intensity of at least 500 mW/cm² after at least 1.0 second has passed after ink discharge so that the integrated exposure for a wavelength region of 240 to 400 nm is 20 to 250 mJ/cm²,

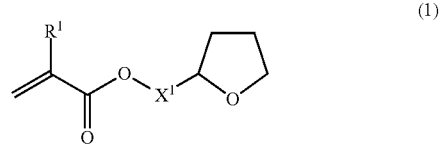

(1)

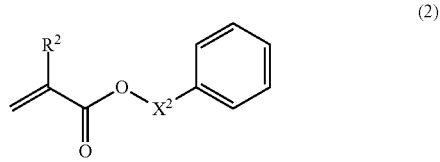

(2)

wherein $R^1$ and $R^2$ denote a hydrogen atom or a methyl group, and $X^1$ and $X^2$ denote a single bond or a divalent linking group,

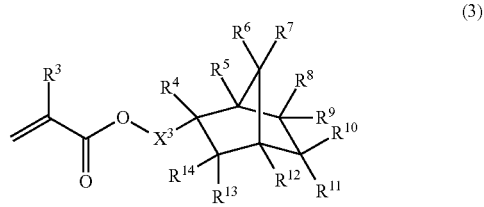

(3)

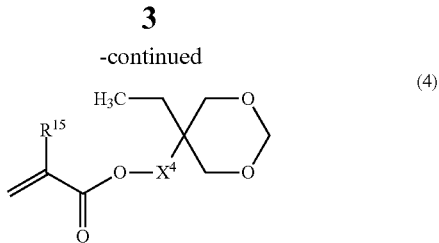

(4)

wherein $R^3$ and $R^{15}$ denote a hydrogen atom or a methyl group, $R^4$ to $R^{14}$ independently denote a hydrogen atom or an alkyl group, and $X^3$ and $X^4$ denote a single bond or a divalent linking group, <2> the inkjet recording method according to <1> above, wherein image formation is carried out by repeating steps (1) to (3) above 2 to 16 times for the same area, <3> the inkjet recording method according to <1> or <2> above, wherein Component A comprises an N-vinyllactam, <4> the inkjet recording method according to <3> above, wherein Component A comprises an N-vinyllactam and a compound represented by Formula (2), <5> the inkjet recording method according to any one of <1> to <4> above, wherein Component B comprises a compound represented by Formula (4), <6> the inkjet recording method according to <5> above, wherein Component B comprises a compound represented by Formula (3) and a compound represented by Formula (4), <7> the inkjet recording method according to any one of <1> to <6> above, wherein the polymerization initiator comprises an α-hydroxyketone compound and a monoacylphosphine oxide compound, <8> the inkjet recording method according to any one of <1> to <7> above, wherein it is carried out using a mechanism comprising at least one exposure means on both sides of an inkjet head unit, <9> the inkjet recording method according to any one of <1> to <8> above, wherein there are 2 to 4 inkjet heads for each color, <10> the inkjet recording method according to any one of <1> to <9> above, wherein the total integrated exposure in a wavelength region of 240 to 400 nm, for the area onto which the ink is discharged, during a period of time from at least 1.0 sec after the ink is first discharged to completion of image formation is 300 to 1,500 $mJ/cm^2$, <11> the inkjet recording method according to any one of <1> to <10> above, wherein the surface tension of the inks of each color is 31.0 to 39.0 mN/m, <12> the inkjet recording method according to any one of <1> to <11> above, wherein the content of polyfunctional (meth)acrylate compound in the inks of each color is 5 to 20 wt %, and <13> the inkjet recording method according to any one of <1> to <12> above, wherein the light sources used in step (2) above and step (3) above are light sources that have the same emission spectrum.

EXPLANATION OF REFERENCE NUMERALS AND SYMBOLS

Figure 1:
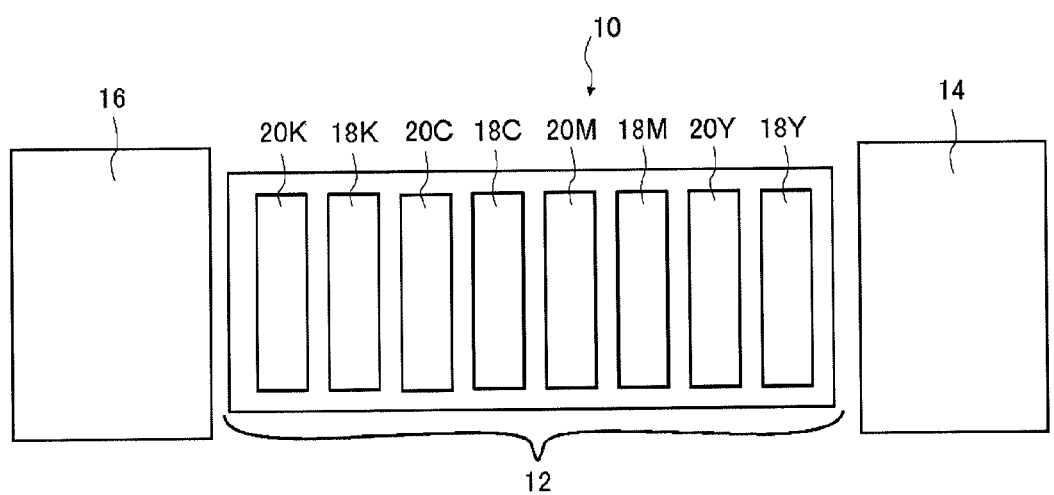
FIG. 1 is a schematic drawing of one example of a mechanism equipped with exposure means on both sides of an inkjet head unit (lamp-equipped inkjet head) that can suitably be used in the inkjet recording method of the present invention.

10: mechanism equipped with exposure means on both sides of inkjet head unit (lamp-equipped inkjet head)
12: inkjet head unit
14, 16: exposure means
18Y, 20Y: yellow inkjet head
18M, 20M: magenta inkjet head
18C, 20C: cyan inkjet head
18K, 20K: black inkjet head Mode for Carrying out the Invention The present invention is explained in detail below.

In the specification, the notation 'A to B', which expresses a numerical range, has the same meaning as 'at least A but no greater than B'. Furthermore, '(Component A) at least one type of polymerizable compound selected from the group consisting of an N-vinyllactam, a compound represented by Formula (1), and a compound represented by Formula (2)', etc. is also simply called 'Component A', etc.

Inkjet Recording Method

The inkjet recording method of the present invention is one in which image formation is carried out by employing an ink set comprising at least a cyan ink, a magenta ink, a yellow ink, and a black ink (also called a cyan ink composition, a magenta ink composition, a yellow ink composition, and a black ink composition respectively), the inks of each color comprising a polymerizable compound and a polymerization initiator, the polymerizable compound in the inks of each color comprising (Component A) at least one type of polymerizable compound selected from the group consisting of an N-vinyllactam, a compound represented by Formula (1), and a compound represented by Formula (2), and (Component B) at least one type of polymerizable compound selected from the group consisting of a compound represented by Formula (3) and a compound represented by Formula (4), the total content of Component A and Component B in the inks of each color being 55 to 85 wt % relative to the entire weight of the ink, and discharge of the inks being repeated 2 to 16 times for the same area, the method comprising at least (1) a step of discharging an ink via an inkjet head, (2) a step of irradiating the discharged ink with actinic radiation by exposure means having an illumination intensity of at least 50 $mW/cm^2$ but less than 500 $mW/cm^2$ at a time between 0 and 1.0 second after ink discharge so that the integrated exposure for a wavelength region of 240 to 400 nm is no greater than 40 $mJ/cm^2$, and (3) a step of irradiating the discharged ink with actinic radiation by exposure means having an illumination intensity of at least 500 $mW/cm^2$ after at least 1.0 second has passed after ink discharge so that the integrated exposure for a wavelength region of 240 to 400 nm is 20 to 250 $mJ/cm^2$.

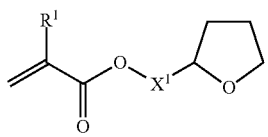

(1)

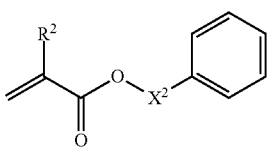

(2)

(In the Formula, $R^1$ and $R^2$ denote a hydrogen atom or a methyl group, and $X^1$ and $X^2$ denote a single bond or a divalent linking group.)

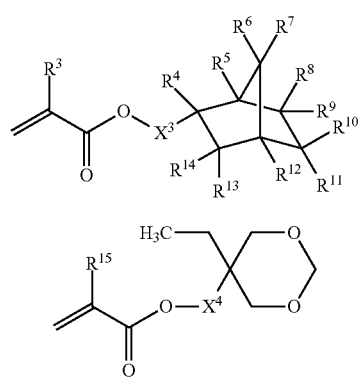

(3)

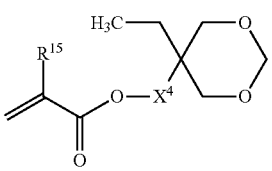

(4)

(In the Formula, $R^3$ and $R^{15}$ denote a hydrogen atom or a methyl group, $R^4$ to $R^{14}$ independently denote a hydrogen atom or an alkyl group, and $X^3$ and $X^4$ denote a single bond or a divalent linking group.)

It is said that, compared with a printed material obtained by aqueous inkjet or solvent inkjet, a printed material obtained by actinic radiation-curing type inkjet printing has low surface gloss of a cured film and conspicuous stripe unevenness. It is thought that this is mainly due to the shape of a fired droplet when landing being maintained since the fired droplet is cured by actinic radiation immediately after inkjet landing.

On the other hand, the ink composition that can be used in the present invention provides an inkjet image that has high color saturation, high image reflection density, excellent surface gloss for a printed material, and suppressed stripe unevenness. Although the reason is not clear, the discharged ink composition comprising Component A and Component B as monomer components cures from the interior of a fired droplet by irradiation with actinic radiation immediately after landing.

Due to the presence of Component B, which is expected to have a particularly high dissolved oxygen content, the outermost surface of a cured film is subjected to oxygen polymerization inhibition to thus reduce the initial reaction rate, the fired droplet outermost surface is maintained in a liquid state for a long time, and the fired droplet outermost surface spreads while wet, thus promoting coalescence. It is surmised that, as a result, a smoother surface is formed, and an image having a high degree of surface gloss and inconspicuous stripe unevenness is obtained. For printing in a multipass mode in which printing is carried out by overprinting the same area, a fired droplet might overlap a previously fired droplet during overprinting. During this process, if the outermost surface of a previously fired droplet ink film is in a liquid state, spreading while wet of a subsequently fired droplet becomes large, and a higher surface gloss is obtained.

When controlling the state of cure of a fired droplet, it is important that only the very outermost surface of a fired droplet is maintained in a liquid state. If the interior of a fired droplet were also maintained in a liquid state for a long time of period, the final printed material would become tacky, or a fired droplet that had subsequently landed during overprinting would enter the interior of the film, thus forming a crater-like dent in the printed material. As a result, the smoothness of a printed material surface might be lost unexpectedly. Furthermore, when the curability of the interior is low, it is thought that due to fired droplet interference after landing (displacement of fired droplets due to overlapping of fired droplets) being caused, stripe unevenness might become conspicuous. It is surmised that due to the presence of Component A high curability can be maintained for the interior.

In accordance with the present invention, it is thought that, due to the combination of Component A and Component B, while strongly promoting the curability of the interior of a fired droplet, the cured film outermost surface alone can be selectively maintained in a liquid state for a long period of time, and a printed material having high surface gloss and inconspicuous stripe unevenness is obtained.

In addition, in order to obtain an inkjet image having high color saturation, high image reflection density, excellent surface gloss for a printed material, and suppressed stripe unevenness, it is thought that the method for irradiation with actinic radiation is also very important. Although it is possible as described above to maintain the cured film surface in a liquid state for a long time and promote spreading of a fired droplet by delaying the timing of curing or carrying out a very low degree of exposure, this easily causes fired droplet interference (displacement of fired droplets due to overlapping of fired droplets), and stripe unevenness becomes conspicuous. In the present invention, it is surmised that, due to an exposure step in which, using an ink composition comprising Component A and Component B at specific contents, irradiation is carried out at a time between 0 and 1.0 second after discharge with an illumination intensity of 50 to 500 mW/cm$^2$ and an integrated exposure for a wavelength region of 240 to 400 nm of no greater than 40 mJ/cm$^2$ and, furthermore, irradiation is carried out at least 1.0 second after a droplet is fired with an illumination intensity of at least 500 mW/cm$^2$ and an integrated exposure for a wavelength region of 240 to 400 nm of 20 to 250 mJ/cm$^2$, it is difficult for fired droplet interference (displacement of fired droplets due to overlapping of fired droplets) to occur, spreading while wet of a fired droplet is optimized, and an inkjet image having high color saturation, high image reflection density, excellent surface gloss for a printed material, and suppressed stripe unevenness is obtained.

The 'image' in the present invention includes not only ones having individual meanings such as characters, symbols, or graphics but also ones having no meaning, such as patterns or solid color.

The 'integrated exposure for a wavelength region of 240 to 400 nm' in the present invention denotes a figure obtained by integrating the exposure for a wavelength region of 240 to 400 nm in one exposure.

Furthermore, the 'total integrated exposure for a wavelength region of 240 to 400 nm' in the present invention denotes a figure obtained by summing the integrated exposures for the wavelength region of 240 to 400 nm for each exposure with respect to all exposures within a prescribed time.

Ink Set

The inkjet recording method of the present invention uses an ink set comprising at least a cyan ink, a magenta ink, a yellow ink, and a black ink.

The ink set that can be used in the present invention may comprise an ink of a color other than a cyan ink, a magenta ink, a yellow ink, and a black ink or may comprise two or more types of the same color inks. Examples of the ink of another color are not particularly limited but include a white ink, a light cyan ink, a light magenta ink, a gray ink, and a metallic ink.

Furthermore, the inks of each color of the cyan, magenta, yellow, and black inks comprise at least a polymerizable compound and a polymerization initiator; moreover, the polymerizable compound in the inks of each color comprises (Component A) at least one type of polymerizable compound selected from the group consisting of an N-vinyllactam, a compound represented by Formula (1), and a compound represented by Formula (2), and (Component B) at least one type of polymerizable compound selected from the group consisting of a compound represented by Formula (3) and a compound represented by Formula (4) and, furthermore, the total content of Component A and Component B in the inks of each color is 55 to 85 wt % relative to the entire weight of the ink.

The ink other than a cyan ink, a magenta ink, a yellow ink, and a black ink in the ink set that can be used in the present invention may or may not satisfy each of the above-mentioned ink requirements, but preferably satisfies them.

The components, etc. of the ink that can be used in the present invention are explained in detail below.

The ink composition can be used in the present invention is an oil-based ink composition that is curable upon exposure to actinic radiation.

The 'actinic radiation' referred to in the present invention is radiation that can provide energy that enables an initiating species to be generated in the ink composition when irradiated, includes α rays, γ rays, X rays, ultraviolet rays, visible light, and an electron beam. Among these, ultraviolet rays and an electron beam are preferable from the viewpoint of curing sensitivity and the availability of equipment, and ultraviolet rays are more preferable.

(Component A) at Least One Type of Polymerizable Compound Selected from the Group Consisting of an N-Vinyllactam, a Compound Represented by Formula (1), and a Compound Represented by Formula (2)

A cyan ink, a magenta ink, a yellow ink, and a black ink that can be used in the present invention comprise at least one type of polymerizable compound selected from the group consisting of an N-vinyllactam, a compound represented by Formula (1), and a compound represented by Formula (2), and preferably at least two type of polymerizable compound selected from the group consisting of an N-vinyllactam, a compound represented by Formula (1), and a compound represented by Formula (2).

As Component A, the ink composition comprises preferably an N-vinyllactam, and more preferably an N-vinyllactam and a compound represented by Formula (2).

A-1. N-Vinyllactam

The ink composition of the present invention comprises N-vinyllactam. N-vinyllactam is preferably a compound represented by Formula (A-1).

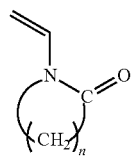

In Formula (A-1), n denotes an integer of 2 to 6; n is preferably an integer of 3 to 5 from the viewpoint of flexibility after the ink composition is cured, adhesion to a recording medium, and ready availability of starting materials, n is more preferably 3 or 5, and n is particularly preferably 5, which is N-vinylcaprolactam. N-vinylcaprolactam is preferable since it has excellent safety, is commonly used and is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring.

Component 1-A may be used singly or in a combination of two or more compounds.

The content of N-vinyllactam is preferably 5 to 35 wt % relative to the entire weight of the ink composition, more preferably 8 to 24 wt %, yet more preferably 9 to 20 wt %, and particularly preferably 10 to 18 wt %. When in the above-mentioned range, a curing profile is promoted in which, while strongly promoting the curability of the interior of a printed material, the outermost surface alone of a cured film is selectively maintained in a liquid state for a long period of time, and an image having high saturation, high reflection color density, excellent surface gloss, and suppressed stripe unevenness is obtained.

A-2. Compound Represented by Formula (1)

The ink composition that can be used in the present invention preferably comprises a compound represented by Formula (1).

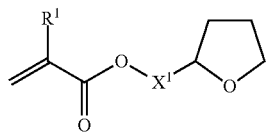

(In Formula (1), $R^1$ denotes a hydrogen atom or a methyl group, and $X^1$ denotes a single bond or a divalent linking group.)

$R^1$ in Formula (1) denotes a hydrogen atom or a methyl group, and from the viewpoint of cure rate it is preferably a hydrogen atom.

Preferred examples of $X^1$ in Formula (1) include an alkylene group and a group in which at least one alkylene group and at least one bond selected from the group consisting of an ether bond, an ester bond, a urethane bond, and a urea bond are combined, more preferred examples include an alkylene group, an alkyleneoxy group, and a polyalkyleneoxy group, and particularly preferred examples include an alkylene group.

The alkylene group preferably has 1 to 10 carbons, more preferably has 1 to 3 carbons, and particularly preferably has one carbon. The alkylene group may have a substituent, and examples of the substituent include an alkyl group, an aryl group, a halogen atom, and a hydroxy group.

Among them, as the compound represented by Formula (1), tetrahydrofurfuryl (meth)acrylate is preferable, and tetrahydrofurfuryl acrylate is particularly preferable.

The content of the compound represented by Formula (1) is preferably 5 to 35 wt % relative to the entire weight of the ink composition, more preferably 8 to 24 wt %, yet more preferably 9 to 20 wt %, and particularly preferably 10 to 18 wt %. When in the above-mentioned range, a curing profile is promoted in which, while strongly promoting the curability of the interior of a printed material, the outermost surface alone of a cured film is selectively maintained in a liquid state for a long period of time, and an image having high saturation, high reflection color density, excellent surface gloss, and suppressed stripe unevenness is obtained.

A-3. Compound Represented by Formula (2)

The ink composition that can be used in the present invention preferably comprises a compound represented by Formula (2).

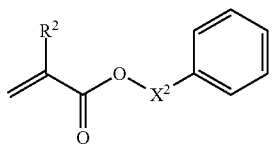

(2)

(In Formula (2), $R^2$ denotes a hydrogen atom or a methyl group, and $X^2$ denotes a single bond or a divalent linking group.)

$R^2$ in Formula (2) denotes a hydrogen atom or a methyl group, and from the viewpoint of cure rate it is preferably a hydrogen atom.

Preferred examples of $X^2$ in Formula (2) include an alkylene group and a group in which at least one alkylene group and at least one bond selected from the group consisting of an ether bond, an ester bond, a urethane bond, and a urea bond are combined, more preferred examples include an alkylene group, an alkyleneoxy group, and a polyalkyleneoxy group, and particularly preferred examples include an alkylene group.

The alkylene group preferably has 2 to 10 carbons, more preferably has 2 to 4 carbons, and particularly preferably has 2 carbons. The alkylene group may have a substituent, and examples of the substituent include an alkyl group, an aryl group, a halogen atom, and a hydroxy group.

Among them, as the compound represented by Formula (2), phenoxyethyl (meth)acrylate is preferable, and phenoxyethyl acrylate is particularly preferable.

The content of the compound represented by Formula (2) is preferably 5 to 60 wt % relative to the entire weight of the ink composition, more preferably 10 to 50 wt %, yet more preferably 15 to 45 wt %, and particularly preferably 18 to 40 wt %. When in the above-mentioned range, a curing profile is promoted in which, while strongly promoting the curability of the interior of a printed material, the outermost surface alone of a cured film is selectively maintained in a liquid state for a long period of time, and an image having high saturation, high reflection color density, and excellent surface gloss, and suppressed stripe unevenness is obtained.

(Component B) at Least One Type of Polymerizable Compound Selected from the Group Consisting of Compound Represented by Formula (3) and Compound Represented by Formula (4)

The cyan ink, magenta ink, yellow ink, and black ink that can be used in the present invention comprise at least one type of polymerizable compound selected from the group consisting of a compound represented by Formula (3) and a compound represented by Formula (4), and preferably comprise a compound represented by Formula (3) and a compound represented by Formula (4).

B-1. Compound Represented by Formula (3)

The ink composition can be used in the present invention preferably comprises a compound represented by Formula (3).

When a compound represented by Formula (3) is comprised, an image having high saturation, excellent surface gloss, and suppressed stripe unevenness is obtained.

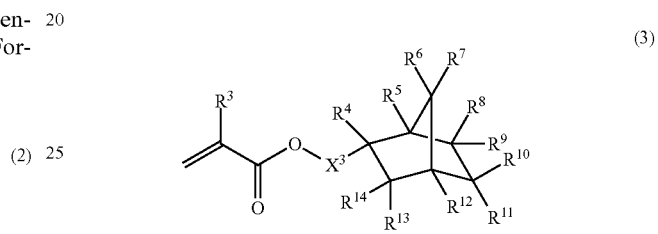

(3)

(In Formula, $R^3$ denotes a hydrogen atom or a methyl group, $R^4$ to $R^{14}$ independently denote a hydrogen atom or an alkyl group, and $X^3$ denotes a single bond or a divalent linking group.)

The compound represented by Formula (3) may be an acrylate compound or a methacrylate compound, but is preferably an acrylate compound, that is, $R^3$ is a hydrogen atom.

The divalent linking group denoted by $X^3$ in Formula (3) is not particularly limited as long as the effects of the present invention are not greatly impaired; it is preferably a divalent hydrocarbon group or a divalent group in which a hydrocarbon group and an ether bond are combined, and is more preferably a divalent hydrocarbon group, an alkyleneoxy group, or an alkyleneoxy alkyl group, a poly(alkyleneoxy) group, or a poly(alkyleneoxy)alkyl group. Furthermore, the number of carbons of the divalent linking group is preferably 1 to 60, and more preferably 1 to 40.

$X^3$ in Formula (3) is preferably a single bond, a divalent hydrocarbon group, or a divalent group in which a hydrocarbon group and an ether bond are combined, more preferably a single bond or a divalent hydrocarbon group, and particularly preferably a single bond.

The alkyl group denoted by $R^4$ to $R^{14}$ in Formula (3) is preferably an alkyl group having 1 to 8 carbons, more preferably an alkyl group having 1 to 4 carbons, and particularly preferably a methyl group. Furthermore, the alkyl group denoted by $R^4$ to $R^{14}$ may have a straight chain, branched, or ring structure.

It is preferable that $R^4$ to $R^{14}$ in Formula (3) are independently a hydrogen atom or an alkyl group having 1 to 8 carbons, more preferably a hydrogen atom or an alkyl group having 1 to 4 carbons, and yet more preferably a hydrogen atom or a methyl group.

Furthermore, it is particularly preferable that $R^4$ to $R^{14}$ in Formula (3) are all hydrogen atoms or $R^5$ to $R^7$ are methyl groups and $R^4$ and $R^5$ to $R^{14}$ are hydrogen atoms, and it is most preferable that $R^5$ to $R^7$ are methyl groups and $R^4$ and $R^5$ to $R^{14}$ are hydrogen atoms.

Specific examples of compounds represented by Formula (3) include, but of course are not limited to, compounds (B-1-1) to (B-1-6) shown below.

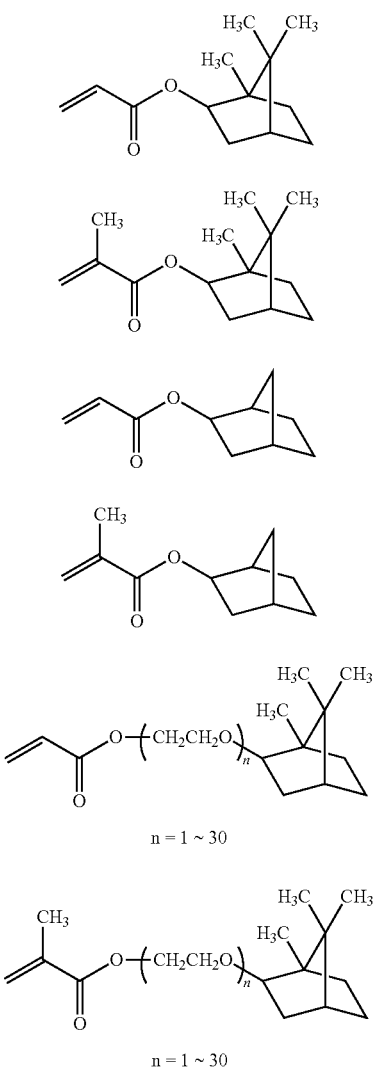

Among them, isobornyl acrylate (B-1-1), isobornyl methacrylate (B-1-2), norbornyl acrylate (B-1-3), and norbornyl methacrylate (B-1-4) are preferable, isobornyl acrylate (B-1-1) and isobornyl methacrylate (B-1-2) are more preferable, and isobornyl acrylate (B-1-1) is particularly preferable.

The content of the compound represented by Formula (3) in the ink composition may be used the present invention is preferably 7 to 45 wt %, more preferably 10 to 40 wt %, yet more preferably 12 to 35 wt %, particularly preferably 15 to 30 wt %.

B-2. Compound Represented by Formula (4)

The ink composition that can be used in the present invention preferably comprises a compound represented by Formula (4).

When a compound represented by Formula (4) is comprised, an image having high saturation, excellent surface gloss, and suppressed stripe unevenness is obtained.

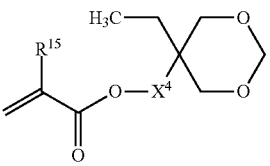

(In Formula (4), $R^{15}$ denotes a hydrogen atom or a methyl group, and $X^4$ denotes a single bond or a divalent linking group.)

The compound represented by Formula (4) may be an acrylate compound or a methacrylate compound, but is preferably an acrylate compound, that is, $R^{15}$ is a hydrogen atom.

The divalent linking group denoted by $X^4$ in Formula (4) is not particularly limited as long as the effects of the present invention are not greatly impaired; it is preferably a divalent hydrocarbon group or a divalent group in which a hydrocarbon group and an ether bond are combined, and is more preferably a divalent hydrocarbon group, an alkyleneoxy group, or an alkyleneoxy alkyl group, a poly(alkyleneoxy) group, or a poly(alkyleneoxy)alkyl group. Furthermore, the number of carbons of the divalent linking group is preferably 1 to 60, and more preferably 1 to 20.

$X^4$ in Formula (4) is preferably a single bond, a divalent hydrocarbon group, or a divalent group in which a hydrocarbon group and an ether bond are combined, more preferably a divalent hydrocarbon group having 1 to 20 carbons, yet more preferably a divalent hydrocarbon group having 1 to 8 carbons, and particularly preferably a methylene group.

Specific preferred examples of compounds represented by Formula (4) include, but of course are not limited to, compounds (B-2-1) to (B-2-4) shown below.

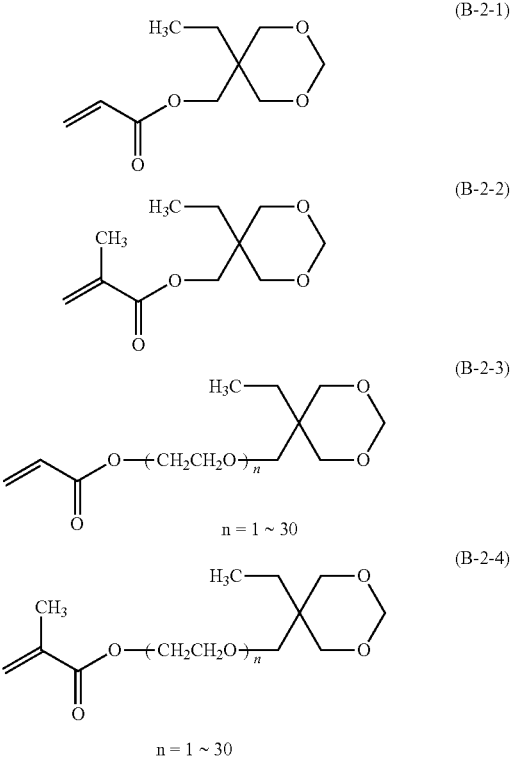

Among them, cyclic trimethylolpropane formal acrylate (B-2-1) and cyclic trimethylolpropane formal methacrylate (B-2-2) are preferable, and cyclic trimethylolpropane formal acrylate (B-2-1) is particularly preferable.

The content of the compound represented by Formula (4) in The ink composition can be used in the present invention is preferably 10 to 15 wt % relative to the entire weight of the ink composition.

The cyan ink, magenta ink, yellow ink, and black ink that can be used in the present invention have a total content of Component A and Component B of 55 to 85 wt % of the entire ink composition, preferably 60 to 80 wt %, and particularly preferably 65 to 78 wt %. When in the above-mentioned range, an image having high saturation, high reflection color density, excellent surface gloss, and suppressed stripe unevenness is obtained, and curability and substrate adhesion are excellent.

Furthermore, the ink of another color that can be used in the present invention also preferably has a total content of Component A and Component B in the above-mentioned range.

(Component C) Polymerization Initiator

The ink composition of the present invention comprises (Component C) a polymerization initiator.

The polymerization initiator is a compound that forms a polymerization initiating species by absorbing external energy such as above-mentioned actinic radiation. The polymerization initiator may be used singly or in a combination of two or more compounds.

Preferred examples of the polymerization initiator that can be used in the present invention include a radical polymerization initiator, and more preferred examples thereof include an α-hydroxy ketone compound, a monoacylphosphine compound, an aromatic onium salt compound, an organic peroxide, a thio compound, a hexaarylbiimidazole compound, a ketoxime ester compound, a borate compound, an azinium compound, a metallocene compound, an active ester compound, and a compound having a carbon-halogen bond. Specific examples of the polymerization initiator include radical polymerization initiators described in JP-A-2008-208190. Among them, an aromatic ketone and acylphosphine compound can preferably be cited, and an α-hydroxy ketone compound and an acylphosphine compound can more preferably be cited.

The aromatic ketone is preferably an α-hydroxyketone compound.

Examples thereof include 1-[4-(2-hydroxyethoxy)phenyl]-2-hydroxy-2-methyl-1-propan-1-one, 2-hydroxy-2-methyl-1-phenyl-propan-1-one, and 1-hydroxycyclohexyl phenyl ketone. Among them, 1-hydroxycyclohexyl phenyl ketone compound is preferable. The 1-hydroxycyclohexyl phenyl ketone compound referred to in the present invention comprises a compound obtained by substituting 1-hydroxycyclohexyl phenyl ketone with any substituent. The substituent may be selected freely from a range that enables an ability as a radical polymerization initiator to be exhibited, and specific examples thereof include an alkyl group having 1 to 4 carbons.

Preferred examples of the acylphosphine compound include acylphosphine oxide compounds described in JP-A-2008-208190, and among them a monoacylphosphine oxide compound is more preferable.

Specific examples of the monoacylphosphine compound include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-tolylphenylphosphinate, methyl o-tolylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-tolyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoyl-bis-diphenylphosphine oxide, pivaloyldiphenylphosphine oxide, p-tolyldiphenylphosphine oxide, 4-(t-butyl)benzoyldiphenylphosphine oxide, terephthaloyl-bis-diphenylphosphine oxide, 2-methylbenzoyldiphenylphosphine oxide, versatoyldiphenylphosphine oxide, 2-methyl-2-ethylhexanoyldiphenylphosphine oxide, 1-methylcyclohexanoyldiphenylphosphine oxide, isopropyl pivaloylphenylphosphinate and 2,4,6-trimethylbenzoyldiphenylphosphine oxide, and among them, 2,4,6-trimethylbenzoyldiphenylphosphine oxide is preferable.

The ink composition can be used in the present invention preferably comprises α-hydroxyketone compound and/or acylphosphine oxide compound and more preferably comprises α-hydroxyketone compound and acylphosphine oxide compound. Specifically, the ink composition preferably comprises α-hydroxyketone compound and/or monoacylphosphine oxide compound, and from the viewpoint of the curability and the anti-blocking properties, the combination of α-hydroxyketone compound and monoacylphosphine oxide compound is more preferable.

The ink composition can be used in the present invention preferably does not comprises bisacylphosphine oxide compound.

The ink composition can be used in the present invention preferably contains a sensitizer in order to promote decomposition of the photopolymerization initiator by absorbing specific actinic radiation.

Examples of the sensitizer include polynuclear aromatic compounds (e.g. pyrene, perylene, triphenylene, 2-ethyl-9,10-dimethoxy anthracene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), coumarins (e.g. 7-diethylamino-4-methylcoumarin), and thioxanthones (e.g. thioxanthone, 2-isopropyl thioxanthone, 4-isopropyl thioxanthone).

The ink composition can be used in the present invention preferably does not comprises thioxanthone compound and thiochromanone compound.

The sensitizer may be used singly or in a combination of two or more compounds.

From the viewpoint of curability and uniformity of the degree of curing within a cured film, the content of the polymerization initiator in The ink composition can be used in the present invention is preferably 0.01 to 35 wt % relative to the total content of polymerizable compounds, more preferably 0.5 to 20 wt %, and yet more preferably 1.0 to 15 wt %.

Furthermore, when a sensitizer is used, the total content of the polymerization initiator relative to the content of the sensitizer is preferably in the range of 200:1 to 1:200 as a ratio by weight of polymerization initiator:sensitizer, more preferably 50:1 to 1:50, and yet more preferably 20:1 to 1:5.

When a sensitizer is used, from the viewpoint of ink coloration properties, the content of the sensitizer in the ink composition is preferably 0.01 to 20 wt % relative to the total weight of the ink, more preferably 0.1 to 15 wt %, and yet more preferably 0.5 to 10 wt %.

(Component D) Other Polymerizable Compound

The ink composition of the present invention may comprise a polymerizable compound other than Component A and Component B.

As the other polymerizable compound, an ethylenically unsaturated compound is preferable.

As the other polymerizable compound, a known polymerizable compound may be used, and examples thereof include a (meth)acrylate compound, a vinyl ether compound, an allyl compound, an N-vinyl compound, and an unsaturated carboxylic acid other than Component A and Component B. Examples thereof include radically polymerizable monomers described in JP-A-2009-221414, polymerizable compounds described in JP-A-2009-209289, and ethylenically unsaturated compounds described in JP-A-2009-191183.

As the other polymeizable compound, a (meth)acrylate compound is preferable, and an acrylate compound is more preferable.

From the viewpoint of improving the surface gloss of a printed material, The ink composition can be used in the present invention preferably comprise a (meth)acrylate compound containing a chain-form hydrocarbon group having 8 to 13 carbons.

The chain-form hydrocarbon group may be a straight chain hydrocarbon group or a branched chain hydrocarbon group.

A (meth)acrylate compound containing a chain-form hydrocarbon group having 8 to 13 carbons is preferably a (meth)acrylic acid ester of a chain-form hydrocarbon monoalcohol having 8 to 13 carbons, and more preferably a (meth)acrylic acid ester of a chain-form hydrocarbon monoalcohol having 10 to 13 carbons.

In the present invention, when both or either of 'acrylate' and 'methacrylate' are referred to, it might be expressed as '(meth)acrylate', and when both or either of 'acrylic' and 'methacrylic' are referred to, it might be expressed as '(meth)acrylic'.

A (meth)acrylate compound containing a chain-form hydrocarbon group having 8 to 13 carbons may be either an acrylate compound or a methacrylate compound, and is preferably an acrylate compound.

Specific examples of a (meth)acrylate compound containing a chain-form hydrocarbon group having 8 to 13 carbons include octyl (meth)acrylate, isooctyl (meth)acrylate, nonyl (meth)acrylate, decyl (meth)acrylate, isodecyl (meth)acrylate, lauryl (meth)acrylate, and tridecyl (meth)acrylate. Among them, isooctyl (meth)acrylate, decyl (meth)acrylate, isodecyl (meth)acrylate, lauryl (meth)acrylate, and tridecyl (meth)acrylate are preferable, isooctyl (meth)acrylate, isodecyl (meth)acrylate, and tridecyl (meth)acrylate are more preferable, and isodecyl (meth)acrylate is particularly preferable.

The content of a (meth)acrylate compound containing a chain-form hydrocarbon group having 8 to 13 in The ink composition can be used in the present invention is preferably 3 to 25 wt % relative to the total weight of the ink composition. When in the above-mentioned range, an ink composition that gives a cured film with little tackiness and a printed material having excellent surface gloss can be obtained.

The ink composition that can be used in the present invention preferably comprises as another polymerizable compound a polyfunctional polymerizable compound, and more preferably a polyfunctional (meth)acrylate compound.

Furthermore, with regard to the ink composition that can be used in the present invention, the content of a compound having two or more ethylenically unsaturated bonds (polyfunctional polymerizable compound) is preferably 0 to 30 wt % of the entire ink composition, more preferably 3 to 25 wt %, and yet more preferably 5 to 20 wt %. Moreover, with regard to the ink composition that can be used in the present invention, the content of the polyfunctional (meth)acrylate compound is preferably 3 to 25 wt % of the entire ink composition, and particularly preferably 5 to 20 wt %.

As the polyfunctional polymerizable compound, it is preferable for it to comprise a difunctional (meth)acrylate compound and/or a difunctional vinyl ether compound, and it is particularly preferable for it to comprise a difunctional (meth)acrylate compound having an optionally branched hydrocarbon chain having at least 5 carbons and/or a divinyl ether compound having an ethylene glycol chain. When it is the above-mentioned embodiment, the curability and the antiblocking properties and flexibility of a printed material are excellent.

Furthermore, the polyfunctional (meth)acrylate compound is preferably a difunctional (meth)acrylate compound or a trifunctional (meth)acrylate compound, and more preferably a difunctional (meth)acrylate compound.

Preferred examples of the polyfunctional (meth)acrylate compound include a difunctional (meth)acrylate compound having a hydrocarbon chain having at least 5 carbons in the molecule, and specific examples include neopentyl glycol di(meth)acrylate, a propylene oxide (PO)-modified neopentyl glycol diacrylate, hexanediol diacrylate, a PO-modified hexanediol diacrylate, nonanediol di(meth)acrylate, decanediol di(meth)acrylate, dodecanediol di(meth)acrylate, tridecanediol di(meth)acrylate, octadecanediol di(meth)acrylate, 3-methyl-1,5-pentanediol di(meth)acrylate, 2-n-butyl-2-ethyl-1,3-propanediol di(meth)acrylate, cyclohexanedimethanol di(meth)acrylate, and cyclohexane di(meth)acrylate. Among them, a PO-modified neopentyl glycol di(meth)acrylate can be preferably cited.

In accordance with the use of a polyfunctional (meth)acrylate compound, and in particular the above-mentioned compounds, an ink composition giving excellent surface gloss and having excellent curability is obtained. Furthermore, from the viewpoint of curability and antiblocking properties, a polyfunctional acrylate compound is preferable.

Preferred examples of the other polymerizable compound include an aromatic group-containing monofunctional (meth)acrylate compound other than compound represented in the formula (2). The cyclic structure of the aromatic group-containing monofunctional (meth)acrylate compound may contain a hetero atom such as O, N, S, etc.

Preferred examples of an aromatic ring structure that the aromatic group-containing monofunctional (meth)acrylate compound other than compound represented in the formula (2) may have include a ring structure selected from the group consisting of benzene, naphthalene, anthracene, indene, fluorene, 1H-phenalene, phenanthrene, triphenylene, pyrene, naphthacene, tetraphene, biphenyl, as-indacene, s-indacene, acenaphthylene, fluoranthene, acephenanthrylene, aceanthrylene, chrysene, pleiadene, furan, thiophene, pyrroline, pyrazoline, imidazoline, isooxazoline, isothiazoline, pyridine, pyridazine, pyrimidine, pyrazine, triazole, and tetrazole.

Examples of the other polymerizable compound include unsaturated carboxylic acids such as acrylic acid, methacrylic acid, itaconic acid, crotonic acid, isocrotonic acid, and maleic acid, and salts thereof, an ethylenically unsaturated group-containing anhydride, acrylonitrile, styrene and, furthermore, radically polymerizable compounds such as various types of unsaturated polyesters, unsaturated polyethers, unsaturated polyamides, and unsaturated urethane.

Examples of other polymerizable compound include (meth)acrylic acid derivatives such as 2-ethylhexyl(meth)acrylate, 2-hydroxyethyl(meth)acrylate, butoxyethyl(meth)

acrylate, carbitol (meth)acrylate, cyclohexyl (meth)acrylate, benzyl (meth)acrylate, methyl (meth)acrylate, n-butyl (meth) acrylate, allyl (meth)acrylate, glycidyl (meth)acrylate, dimethylaminomethyl (meth)acrylate, bis(4-(meth)acryloxypolyethoxyphenyl)propane, ethylene glycol di(meth) acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, pentaerythritol tri(meth)acrylate, pentaerythritol tetra(meth)acrylate, dipentaerythritol tetra (meth)acrylate, trimethylolethane tri(meth)acrylate, trimethylolpropane tri(meth)acrylate, tetramethylolmethane tetra (meth)acrylate, oligoester (meth)acrylate, 2,2-bis(4-(meth) acryloxypolyethoxyphenyl)propane, N-methylol (meth) acrylamide, diacetone (meth)acrylamide, and epoxy (meth) acrylate, allyl compound derivatives such as allyl glycidyl ether, diallyl phthalate, triallyl trimellitate, etc.

More specifically, commercially available or industrially known radically polymerizable or crosslinking monomers, oligomers, and polymers, such as those described in 'Kakyozai Handobukku' (Crosslinking Agent Handbook), Ed. S. Yamashita (Taiseisha, 1981); 'UV/EB Koka Handobukku (Genryo)' (UV/EB Curing Handbook (Starting Materials)) Ed. K. Kato (Kobunshi Kankoukai, 1985); 'UV/EB Koka Gijutsu no Oyo to Shijyo' (Application and Market of UV/EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

The molecular weight of the other polymerizable monomer is preferably 80 to 2,000 and more preferably 80 to 1,000, and yet more preferably 80 to 800.

Furthermore, as the other polymerizable compound, it is preferable to use a vinyl ether compound. The vinyl ether compound can be roughly divided into monovinyl ether compound and di- or tri-vinyl ether compound.

Examples of vinyl ether compounds that are suitably used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethylene glycol monovinyl ether, triethylene glycol monovinyl ether, hydroxyethyl monovinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, hydroxynonyl monovinyl ether, cyclohexanedimethanol monovinyl ether, n-propyl vinyl ether, isopropyl vinyl ether, isopropenyl vinyl ether, dodecyl vinyl ether, and diethylene glycol monovinyl ether.

When the ink composition of the present invention comprise another polymerizable compound, the content of the other polymerizable compound in the ink composition of the present invention is preferably 1 to 40 wt % relative to the total weight of the ink composition, more preferably 3 to 30 wt %, and particularly preferably 5 to 25 wt %.

Furthermore, when the ink composition of the present invention comprise a polyfunctional polymerizable compound and the content of the compound represented by Formula (2) is 13 to 55 wt %, the content of the polyfunctional polymerizable compound is preferably 1 to 20 wt % relative to the total weight of the ink composition, more preferably 2 to 10 wt %, and particularly preferably 3 to 7 wt %.

When the ink composition of the present invention comprise another polymerizable compound, the content of the other polymerizable compound in the ink composition of the present invention is preferably 1 to 30 wt % relative to the total weight of the ink composition, more preferably 3 to 25 wt %, and particularly preferably 5 to 20 wt %.

(Component E) Oligomer

The ink composition can be used in the present invention preferably comprises (Component E) an oligomer.

An oligomer is generally a polymer in which a limited number (usually 5 to 100) of monomers are bonded, and known compounds called oligomers may be selected freely, but in the present invention it is preferable to select a polymer having a weight-average molecular weight of 400 to 10,000 (more preferably 500 to 5,000).

The oligomer may have a radically polymerizable group. The radically polymerizable group is preferably an ethylenically unsaturated group, and more preferably a (meth)acryloxy group.

The oligomer in the present invention may be any oligomer, and examples thereof include an olefin-based oligomer (an ethylene oligomer, a propylene oligomer, a butene oligomer, etc.), a vinyl-based oligomer (a styrene oligomer, a vinyl alcohol oligomer, a vinylpyrrolidone oligomer, an acrylate oligomer, a methacrylate oligomer, etc.), a diene-based oligomer (a butadiene oligomer, a chloroprene rubber, a pentadiene oligomer, etc.), a ring-opening polymerization type oligomer (di-, tri-, tetra-ethylene glycol, polyethylene glycol, polyethylimine, etc.), an addition-polymerization type oligomer (an oligoester acrylate, a polyamide oligomer, a polyisocyanate oligomer), and an addition-condensation oligomer (a phenolic resin, an amino resin, a xylene resin, a ketone resin, etc.). Among them an oligoester (meth)acrylate is preferable, and among them a urethane (meth)acrylate, a polyester (meth)acrylate, and an epoxy (meth)acrylate are preferable, and a urethane (meth)acrylate is more preferable.

As the urethane (meth)acrylate, an aliphatic urethane (meth)acrylate and an aromatic urethane (meth)acrylate may preferably be cited, and an aliphatic urethane (meth)acrylate may more preferably be cited.

Furthermore, the urethane (meth)acrylate is preferably a tetra- or lower-functional urethane (meth)acrylate, and more preferably a di- or lower-functional urethane (meth)acrylate.

In accordance with a urethane (meth)acrylate being contained, an ink composition having excellent adhesion to a substrate and excellent curability is obtained.

With respect to the oligomer, 'Origomar Handobukku (Oligomer Handbook)' (edited by Junji Furukawa, The Chemical Daily Co., Ltd.) may also be referred to.

As oligomer commercial products, examples of urethane (meth)acrylates include R1204, R1211, R1213, R1217, R1218, R1301, R1302, R1303, R1304, R1306, R1308, R1901, and R1150 manufactured by Dai-Ichi Kogyo Seiyaku Co., Ltd., the EBECRYL series (e.g. EBECRYL 230, 270, 4858, 8402, 8804, 8807, 8803, 9260, 1290, 1290K, 5129, 4842, 8210, 210, 4827, 6700, 4450, and 220) manufactured by Daicel-Cytec Company Ltd., NK Oligo U-4HA, U-6HA, U-15HA, U-108A, and U200AX manufactured by Shin-Nakamura Chemical Co., Ltd., and Aronix M-1100, M-1200, M-1210, M-1310, M-1600, and M-1960 manufactured by Toagosei Co., Ltd.

Examples of polyester (meth)acrylates include the EBECRYL series (e.g. EBECRY L770, IRR467, 81, 84, 83, 80, 675, 800, 810, 812, 1657, 1810, IRR302, 450, 670, 830, 870, 1830, 1870, 2870, IRR267, 813, IRR483, 811, etc.) manufactured by Daicel-Cytec Company Ltd. and Aronix M-6100, M-6200, M-6250, M-6500, M-7100, M-8030, M-8060, M-8100, M-8530, M-8560, and M-9050 manufactured by Toagosei Co., Ltd.

Examples of epoxy (meth)acrylates include the EBECRYL series (e.g. EBECRYL 600, 860, 2958, 3411, 3600, 3605, 3700, 3701, 3703, 3702, 3708, RDX63182, 6040, etc.) manufactured by Daicel-Cytec Company Ltd.

With regard to the oligomer, one type thereof may be used on its own or two or more types may be used in combination.

The content of the oligomer in The ink composition can be used in the present invention is, relative to the total weight of the ink composition, preferably 0.1 to 50 wt %, more preferably 0.5 to 20 wt %, and yet more preferably 1 to 10 wt %.

(Component F) Surfactant

The ink composition can be used in the present invention may comprise a surfactant in order to impart discharge properties that are stable for a long period of time.

The ink composition can be used in the present invention preferably either does not comprise a silicone-based surfactant or a fluorine-based surfactant or comprises a silicone-based surfactant and a fluorine-based surfactant at a total content of greater than 0 wt % but no greater than 0.01 wt %, more preferably either does not comprise them or comprises them at greater than 0 wt % but no greater than 0.05 wt %, yet more preferably either does not comprise them or comprises them at greater than 0 wt % but no greater than 0.03 wt %, particularly preferably either does not comprise them or comprises them at greater than 0 wt % but no greater than 0.01 wt %, and the most preferably does not comprise them.

Although the reason therefor is not certain, it is surmised that when drawing is carried out, particularly in multipass mode, a surfactant, in particular, a silicone-based surfactant or a fluorine-based surfactant, that reduces the surface energy of a cured film greatly increases the contact angle of a fired droplet that is superimposed on a liquid droplet that has been fired first and cured or semicured, thus degrading the gloss of an image. When in the above-mentioned range, an image having high saturation, high reflection color density, excellent surface gloss, and little stripe unevenness can be obtained.

Examples of a surfactant other than the silicone-based surfactant and fluorine-based surfactant include those described in JP-A-62-173463 and JP-A-62-183457. Examples include an anionic surfactant such as a dialkylsulfosuccinate, an alkylnaphthalenesulfonate, or a fatty acid salt, a nonionic surfactant such as a polyoxyethylene alkyl ether, a polyoxyethylene alkyl allyl ether, an acetylene glycol, or a polyoxyethylene/polyoxypropylene block copolymer, and a cationic surfactant such as an alkylamine salt or a quaternary ammonium salt.

(Component G) Colorant

The ink composition that can be used in the present invention may preferably contain a colorant in order to improve the visibility of a formed image area.

The colorant is not particularly limited, but a pigment and an oil-soluble dye that have excellent weather resistance and rich color reproduction are preferable, and it may be selected from any known coloring agent such as a soluble dye. It is preferable that the colorant does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193;

as a black pigment, Pigment Black 7, 28, or 26;

as a white pigment, Pigment White 6, 18, or 21, etc. may be used according to the intended application.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

It is preferable that the colorant is added to the ink composition and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition, but in order to improve dispersibility it may be added in advance to a solvent or a dispersing medium such as a polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a polymerizable compound. As a polymerizable compound used, it is preferable in terms of dispersion suitability to select a monomer having the lowest viscosity.

The colorants may be used by appropriately selecting one type or two or more types according to the intended purpose of the ink composition.

When a colorant such as a pigment that is present as a solid in the ink composition is used, it is preferable for the colorant, the dispersant, the dispersing medium, dispersion conditions, and filtration conditions to be set so that the average particle size of colorant particles is preferably 0.005 to 0.5 µm, more preferably 0.01 to 0.45 µm, and yet more preferably 0.015 to 0.4 µm. By such control of particle size, clogging of a head nozzle can be suppressed, and the ink storage stability, the transparency, and the curing sensitivity can be maintained.

The content of the colorant in the ink composition is appropriately selected according to the color and the intended purpose, and is preferably 0.01 to 30 wt % relative to the weight of the entire ink composition.

(Component H) Dispersant

The ink composition can be used in the present invention preferably comprises a dispersant. In particular, when the pigment is used, the ink composition preferably comprises a dispersant in order to stably disperse the pigment in the ink composition.

As the dispersant that can be used in the present invention, a polymeric dispersant is preferable. The 'polymeric dispersant' referred to in the present invention means a dispersant having a weight-average molecular weight of 1,000 or greater.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation), Ionet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is generally preferably 0.05 to 15 wt % relative to the weight of the entire ink composition.

<Other Components>

The ink composition can be used in the present invention may comprise as necessary, in addition to the above-mentioned components, a co-sensitizer, a UV absorber, an antioxidant, an antifading agent, a conductive salt, a solvent, a polymer compound, a basic compound, etc. They are described in JP-A-2009-221416 and may be used in the present invention as well.

Furthermore, from the viewpoint of storage properties and suppression of head clogging, the ink composition can be used in the present invention preferably comprises a polymerization inhibitor.

The polymerization inhibitor is preferably added at 200 to 20,000 ppm relative to the total amount of the ink composition of the present invention.

Examples of the polymerization inhibitor include a nitroso-based polymerization inhibitor, a hindered phenol-based polymerization inhibitor, a hindered amine-based polymerization inhibitor, hydroquinone, benzoquinone, p-methoxyphenol, TEMPO, TEMPOL, and Al cupferron.

Properties of Ink Composition

In the present invention, the ink composition has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition that can be used in the present invention, it is preferable that its component ratio is appropriately adjusted so that the viscosity is in the above-mentioned range. When the viscosity at room temperature (25° C.) is set to be high, even when a porous recording medium (support) is used, penetration of the ink composition into the recording medium can be prevented, and uncured monomer can be reduced. Furthermore, ink spreading when droplets of ink composition have landed can be suppressed, and as a result there is the advantage that the image quality is improved.

The surface tension at 25° C. of the ink composition that can be used in the present invention is preferably in the range of 31.0 to 39.0 mN/m, more preferably in the range of 32.0 to 38.0 mN/m, yet more preferably in the range of 33.0 to 37.5 mN/m, and particularly preferably in the range of 33.5 to 37.0 mN/m. Although the reason is not clear, it is surmised that, when drawing is carried out, particularly in multipass mode, if the ink has a lower surface energy than the above-mentioned range, the contact angle of a fired droplet that is printed over a droplet that has been fired first and cured or semicured is greatly increased, and as a result the surface unevenness increases, the surface gloss decreases, and stripe unevenness tends to become conspicuous; when it is higher than the above-mentioned range, the speed at which a fired droplet that has landed on a printed material spreads while wet over a support or a previously fired droplet becomes low, and as a result the surface unevenness increases, the surface gloss decreases, and stripe unevenness tends to become conspicuous. When the surface tension is in the above-mentioned range, an image having high saturation, high reflection color density, excellent surface gloss, and little stripe unevenness can be obtained.

Steps of Inkjet Recording Method

The inkjet recording method of the present invention carries out image formation by repeating ink discharge 2 to 16 times for the same area, and comprises at least (1) a step of discharging an ink via an inkjet head (hereinafter, also called a 'discharge step'), (2) a step of irradiating the discharged ink with actinic radiation by exposure means having an illumination intensity of at least 50 mW/cm$^2$ but less than 500 mW/cm$^2$ at a time between 0 and 1.0 second after ink discharge so that the integrated exposure for a wavelength region of 240 to 400 nm is no greater than 40 mJ/cm$^2$ (hereinafter, also called a 'first exposure step'), and (3) a step of irradiating the discharged ink with actinic radiation by exposure means having an illumination intensity of at least 500 mW/cm$^2$ after at least 1.0 second has passed after ink discharge so that the integrated exposure for a wavelength region of 240 to 400 nm is 20 to 250 mJ/cm$^2$ (hereinafter, also called a 'second exposure step').

Furthermore, the printed material of the present invention is a printed material recorded by the inkjet recording method of the present invention.

The inkjet recording method of the present invention carries out image formation by repeating ink discharge 2 to 16 times for the same area. As a method for forming an image in the inkjet recording method of the present invention, specifically, a multipass method in which an image is formed by forming dots by scanning an inkjet head perpendicular to the transport direction of a recording medium and repeating a plurality of passes according to the scan width can be cited as an example.

In the inkjet recording method of the present invention, it is preferable to carry out image formation by repeating ink discharge 4 to 8 times for the same area.

Furthermore, in the inkjet recording method of the present invention, it is preferable to carry out image formation by repeating steps (1) to (3) above 2 to 16 times for the same area, and it is more preferable to carry out image formation by repeating steps (1) to (3) above 4 to 8 times for the same area.

Discharge Step

The inkjet recording method of the present invention comprises (1) a step of discharging an ink via an inkjet head (discharge step).

The discharge step in the inkjet recording method of the present invention may employ inkjet recording equipment that is described in detail below.

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition onto a recording medium in discharge step of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition, a supply pipe, an ink composition supply tank immediately before an inkjet head, a filter, and a piezo system inkjet head. The piezo system inkjet head may be driven so as to discharge a multisize dot of preferably 1 to 100 pL, more preferably 3 to 42 pL, and yet more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, with respect to the radiation curing ink composition such as the ink composition, since it is desirable for the ink composition to be discharged at a constant temperature, a section from the ink composition supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink composition supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition that can be used in the present invention having an ink viscosity at 25° C. of no more than 50 mPa·s since good discharge stability can be obtained. By employing this method, high discharge stability can be realized.

The radiation curing type ink composition such as the ink composition that can be used in the present invention generally has a viscosity that is higher than that of a normal ink or a water-based ink used for an inkjet recording ink composition, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature of ink composition is preferably ±5° C. of a set temperature, more preferably ±2° C. of the set temperature, and yet more preferably ±1° C. of the set temperature.

First Exposure Step

The inkjet recording method of the present invention comprises (2) a step (first exposure step) of irradiating the discharged ink with actinic radiation by exposure means having an illumination intensity of at least 50 mW/cm$^2$ but less than 500 mW/cm$^2$ at a time between 0 and 1.0 second after ink discharge so that the integrated exposure for a wavelength region of 240 to 400 nm is no greater than 40 mJ/cm$^2$.

The illumination intensity and integrated exposure are an illumination intensity and integrated exposure on a recording medium on which an image is formed. Furthermore, the wavelength region of 240 to 400 nm is in general a wavelength region corresponding to UVA, UVB, and UVC regions.

The illumination intensity of exposure means in the first exposure step is at least 50 mW/cm$^2$ but less than 500 mW/cm$^2$, and is preferably 100 to 400 mW/cm$^2$. When in the above-mentioned range, spreading while wet of a fired droplet is particularly promoted and a printed material having excellent surface gloss is obtained; furthermore, it is difficult for fired droplet interference to occur, and a printed material having inconspicuous stripe unevenness is obtained.

Furthermore, the integrated exposure for a wavelength region of 240 to 400 nm by exposure means in the first exposure step is no greater than 40 mJ/cm$^2$, preferably 5 to 28 mJ/cm$^2$, and more preferably 10 to 25 mJ/cm$^2$.

Moreover, in the first exposure step, discharged ink is exposed by the exposure means at a time between 0 and 1.0 second after ink discharge, but it is preferable to carry out exposure at a time between 0 and 0.7 seconds after ink discharge, it is more preferable to carry out exposure at a time between 0 and 0.5 seconds after ink discharge, and it is particularly preferable to carry out exposure at a time between 0 and 0.4 seconds after ink discharge.

In single-pass inkjet drawing and ink curing of the inkjet recording method of the present invention, it is preferable to carry out exposure by the exposure means, rather than by providing a light source between the ink jet heads of each color and carrying out curing for the image of each color, by carrying out exposure using the exposure means after the inks of all colors are discharged since overlapping between ink fired droplets is large and spreading while wet on a recording medium is promoted, and as a result an image having high surface gloss is obtained.

The ink composition discharged onto a recording medium is cured by irradiation with actinic radiation. This is due to a polymerization initiator contained in the ink composition being decomposed by irradiation with actinic radiation, thus generating a polymerization initiating species, which then functions so as to cause and promote a polymerization reaction of a polymerizable compound. During this process, if a sensitizer is present together with the polymerization initiator in the ink composition, the sensitizer in the system absorbs actinic radiation, attains an exited state, and makes contact with the polymerization initiator, thus promoting decomposition of the polymerization initiator and achieving a curing reaction with higher sensitivity.

The exposure means (light source) in the first exposure step is not particularly limited, and a mercury lamp, a metal halide lamp, a light-emitting diode (LED), etc. may be used. Among them, a mercury lamp or a metal halide lamp is preferably used.

Figure 2:
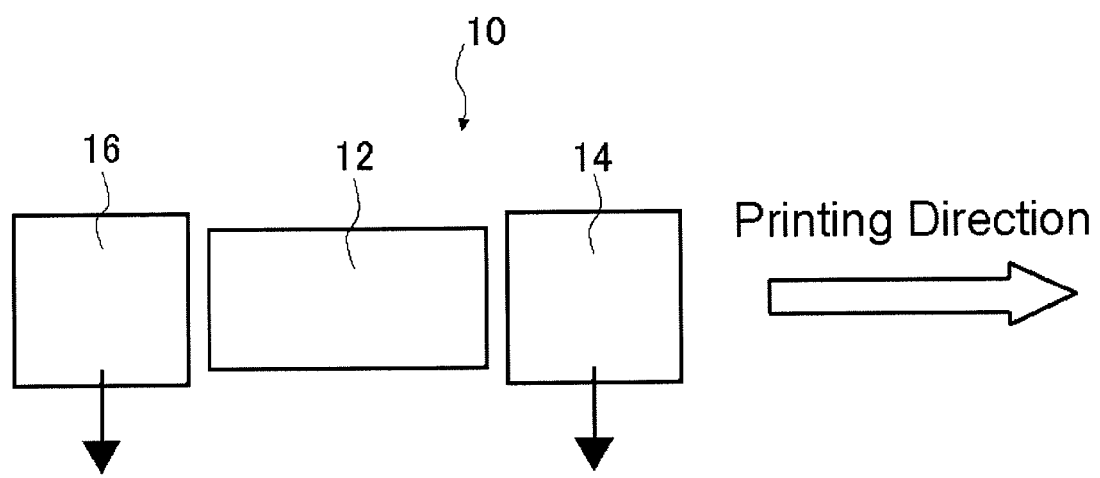
FIG. 2 is a schematic drawing of a case in which the mechanism equipped with exposure means on both sides of an inkjet head unit (lamp-equipped inkjet head) shown in FIG. 1 is operated in the right-hand direction with respect to the plane of the paper.
Figure 3:
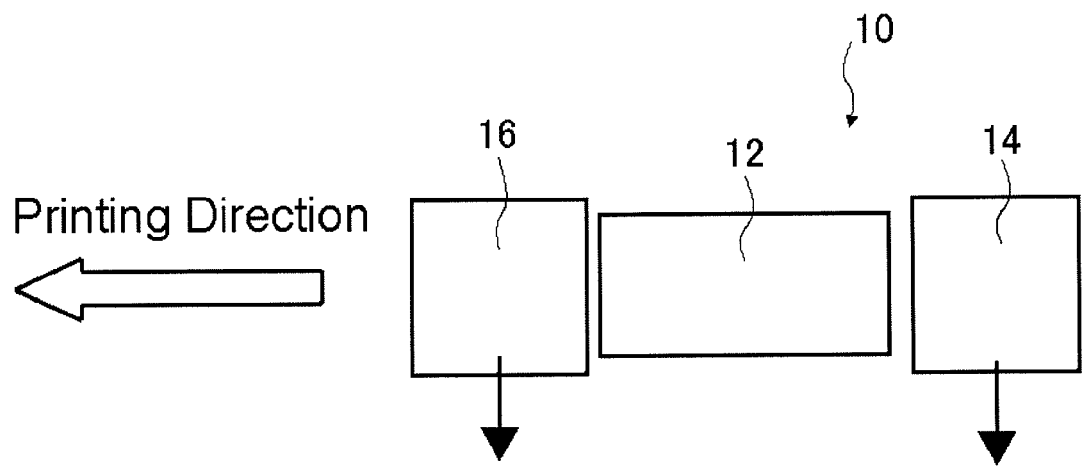
FIG. 3 is a schematic drawing of a case in which the mechanism equipped with exposure means on both sides of an inkjet head unit (lamp-equipped inkjet head) shown in FIG. 1 is operated in the left-hand direction with respect to the plane of the paper.

The position where the light source is placed is not particularly limited, and in the case of a head-scanning type shuttle scanning method as shown in FIG. 2 and FIG. 3, which are described later, for example, by placing the light source on the side of the inkjet head it becomes possible to carry out the initial exposure within 1.0 second from ink discharge. In the case of bidirectional printing, it is preferable to place lamps on both sides of the inkjet head since uniformity of exposure is maintained.

Furthermore, in the case where there is a mechanism for transporting a recording medium, it is also preferable to use a fixed wide lamp. It is also preferable to use in combination a fixed wide lamp and shuttle scanning in which a lamp is placed on the side of the inkjet head.

Second Exposure Step

The inkjet recording method of the present invention comprises (3) a step (second exposure step) of irradiating the discharged ink with actinic radiation by exposure means having an illumination intensity of at least 500 mW/cm$^2$ after at least 1.0 second has passed after ink discharge so that the integrated exposure for a wavelength region of 240 to 400 nm is 20 to 250 mJ/cm$^2$. By allowing at least 1.0 second after ink discharge, spreading while wet of a fired droplet progresses sufficiently, and a printed material having excellent surface gloss is obtained.

The upper limit for the elapsed time from ink discharge to exposure in the second exposure step is not strictly determined, but from the viewpoint of suppression of contamination such as attachment of dust in the air, etc., it is preferably within 1 minute, more preferably within 30 seconds, and particularly preferably within 10 seconds.

From the viewpoint of a balance being achieved between productivity/rapid drying and spreading while wet of a fired droplet, the illumination intensity of the exposure means in the second exposure step is preferably 600 to 3,000 mW/cm$^2$, more preferably 700 to 2,100 mW/cm$^2$, and particularly preferably 800 to 1,500 mW/cm$^2$.

Furthermore, the integrated exposure for a wavelength region of 240 to 400 nm by the exposure means in the second exposure step is 20 to 250 mJ/cm$^2$, preferably 30 to 100 mJ/cm$^2$, and more preferably 40 to 80 mJ/cm$^2$.

As the exposure means in the second exposure step, a light source cited as an example for the exposure means in the first exposure step can suitably be used.

Furthermore, from the viewpoint of matching the light absorption characteristics of a polymerization initiator, it is preferable that the first lamp and the second lamp have the same emission spectrum, and it is more preferable to use identical lamps. It is preferable to adjust a predetermined illumination intensity and integrated exposure by changing the output power. A method for changing the output power of the exposure means, the illumination intensity, or the integrated exposure is not particularly limited, and a known method may be used.

Furthermore, in the inkjet recording method of the present invention, it is preferable that the discharged ink is completely cured by the first exposure step and second exposure step that are carried out the first time after discharge. 'Being completely cured' in the present invention means a state in which the ink interior and surface are completely cured. Specifically, it can be assessed by pressing a permeable medium such as plain paper thereagainst and examining if the ink is transferred to the permeable medium. That is, a case in which there is no transfer at all is called a state of being completely cured.

Furthermore, in the inkjet recording method of the present invention, after carrying out steps (1) to (3), further exposure (so-called post-curing) may be carried out by the exposure means used in the first exposure step, the exposure means used in the second exposure step, and/or other exposure means without carrying out ink discharge.

The illumination intensity of the exposure means in the post-curing is not particularly limited, but is preferably 600 to 3,000 mW/cm$^2$, and more preferably 1,000 to 3,000 mW/cm$^2$.

Furthermore, the integrated exposure for a wavelength region of 240 to 400 nm by the exposure means in the post-curing is 20 to 250 mJ/cm$^2$, preferably 30 to 100 mJ/cm$^2$, and more preferably 40 to 80 mJ/cm$^2$.

Moreover, the inkjet recording method of the present invention preferably does not carry out the post-curing.

Furthermore, in the area where ink is discharged, the total integrated exposure for a wavelength region of 240 to 400 nm during a time from 1.0 second after the initial ink discharge until image formation is completed is preferably at least 300 mJ/cm$^2$, more preferably at least 400 mJ/cm$^2$, and particularly preferably at least 500 mJ/cm$^2$, and it is preferably no greater than 1,500 mJ/cm$^2$, and more preferably no greater than 1,000 mJ/cm$^2$. When in the above-mentioned range, a printed material having excellent surface gloss and inconspicuous stripe unevenness is obtained.

By employing such a inkjet recording method as described above, it is possible to maintain a uniform dot diameter for landed ink composition even for various types of recording medium (support) having different surface wettability, thereby improving the image quality. In order to obtain a color image, it is preferable to superimpose colors in order from those with a high lightness. By superimposing ink compositions in order from one with high lightness, it is easy for radiation to reach a lower ink composition, the curing sensitivity is good, the amount of residual monomer decreases, and an improvement in adhesion can be expected.

The order in which colored ink compositions are discharged is not particularly limited, but it is preferable to apply to a recording medium from a colored ink composition having a high lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow→cyan→magenta→black.

In the present invention, the recording medium is not particularly limited, and a recording medium known as a support and a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

The inkjet recording method of the present invention preferably uses a mechanism equipped with exposure means on both sides of an inkjet head unit (also called a 'lamp-equipped inkjet head') of the type shown in FIG. 1 to FIG. 3.

FIG. 1 is a schematic drawing of one example of a mechanism equipped with exposure means on both sides of an inkjet head unit (lamp-equipped inkjet head) that can suitably be used in the inkjet recording method of the present invention.

A mechanism 10 (lamp-equipped inkjet head 10) equipped with exposure means on both sides of an inkjet head unit shown in FIG. 1 has an inkjet head unit 12 in the middle, and has one exposure means 14, 16 on each of both sides of the inkjet head unit 12. There are provided within the inkjet head unit 12 a total of eight inkjet heads with two for each color (yellow inkjet heads 18Y, 20Y, magenta inkjet heads 18M, 20M, cyan inkjet heads 18C, 20C, black inkjet heads 18K, 20K).

FIG. 2 and FIG. 3 are schematic drawings when the mechanism equipped with exposure means on both sides of an inkjet head unit (lamp-equipped inkjet head) shown in FIG. 1 is operated in each printing direction.

FIG. 2 shows a case in which the printing direction of the lamp-equipped inkjet head 10 is on the right-hand side in the plane of the paper. In the case shown in FIG. 2, exposure means 16 positioned to the rear of the inkjet head unit 12 in the printing direction functions as exposure means in the first exposure step (also called a 'trailing lamp'), and exposure means 14 positioned forward of the inkjet head unit 12 in the printing direction functions as exposure means in the second exposure step (also called a 'leading lamp').

On the other hand, FIG. 3 shows a case in which the printing direction of the lamp-equipped inkjet head 10 is on the left-hand side in the plane of the paper. In the case of FIG. 3, the exposure means 14 positioned to the rear of the inkjet head unit 12 in the printing direction functions as exposure means in the first exposure step (trailing lamp), and the exposure means 16 positioned forward of the inkjet head unit 12 in the printing direction functions as exposure means in the second exposure step (leading lamp).

That is, ink discharged from the inkjet head unit 12 is subjected to the first exposure step by the exposure means 14 or exposure means 16 (trailing lamp) positioned to the rear of the inkjet head unit 12 in the printing direction. Subsequently, when the lamp-equipped inkjet head 10 is operated in the printing direction opposite to the above, the discharged ink that has been subjected to the first exposure step is subjected to the second exposure step by the exposure means 16 or exposure means 14 (leading lamp) positioned forward of the inkjet head unit 12 in the printing direction.

Furthermore, by subsequently repeating ink discharge by the inkjet head unit 12 (discharge step) and the first exposure step and second exposure step, ink discharge is repeated 2 to 16 times for the same area, thus carrying out image formation.

Since the exposure means 14, 16 on both sides of the inkjet head unit 12 function as a trailing lamp and a leading lamp, they are equipped with a mechanism (not illustrated) for changing the illumination intensity of actinic radiation that is to be emitted.

Furthermore, there may be employed as necessary not only a mode as in the lamp-equipped inkjet head 10 shown in FIG. 1 in which one exposure means is provided on each of the left and right of the inkjet head unit 12, but also for example a mode in which two or more exposure means are provided on either one thereof, a mode in which two exposure means are provided on each of the left and right of the inkjet head unit, etc.

Furthermore, there may be employed as necessary not only a mode of the inkjet head unit 12 shown in FIG. 1 in which each color has two inkjet heads, but also for example a mode in which there is one inkjet head for each color, a mode in which there is only an inkjet head for one color, etc. Moreover, in the case of a mode in which an inkjet head unit has only an inkjet head for one color, image recording equipment equipped with inkjet head units for each color can preferably be cited as an example.

Among them, the inkjet recording method of the present invention is preferably a method that uses a mechanism equipped with exposure means on both sides of an inkjet head unit. Furthermore, from the viewpoint of carrying out irradiation within 1.0 second after discharge without causing the problem of ink on the inkjet nozzle surface being cured during waiting by means of leaked light, the distance between exposure means such as a lamp and an inkjet head that is the closest to the exposure means is preferably at least 2 cm but no greater than 30 cm, and more preferably at least 5 cm but no greater than 20 cm.

Furthermore, the image recording equipment that can be used in the present invention preferably has a mechanism equipped with exposure means on both sides of an inkjet head unit.

Moreover, with regard to the inkjet recording method of the present invention, it is preferable for the mechanism equipped with the inkjet head unit and exposure means to be able to scan above the surface of a recording medium and in a direction perpendicular to the transport direction of the recording medium. Furthermore, in the process of image formation by inkjet, in either a case in which a recording medium such as a support is fixed and an inkjet head unit is operated or a case in which an inkjet head is fixed and a recording medium is operated, the speed at which the inkjet head unit or the recording medium is operated is preferably at least 0.5 m/sec but no greater than 3.5 m/sec, more preferably at least 0.7 m/sec but no greater than 3.0 m/sec, and yet more preferably at least 0.9 m/sec but no greater than 2.5 m/sec. When in the above-mentioned range, a system that can achieve a balance between good productivity and good discharge stability in the first exposure within 1.0 second after ink discharge is obtained.

Image formation equipment that can be used in the inkjet recording method of the present invention preferably has 2 to 32 inkjet heads for each color, more preferably 2 to 16 for each color, and particularly preferably 2 to 4 for each color.

In accordance with the present invention, there can be provided an inkjet recording method that can give a printed material having inconspicuous stripe unevenness and excellent surface gloss, curability, and flexibility.

EXAMPLES

The present invention is explained more specifically by reference to Examples and Comparative Examples shown below. However, the present invention is not limited by these Examples.

'Parts' in the description below mean 'parts by weight' unless otherwise specified.

The materials used in the present invention are as follows.
IRGALITE BLUE GLVO (phthalocyanine pigment, Ciba Specialty Chemicals)
CINQUASIA MAGENTA RT355D (C.I. Pigment Violet 19/C.I. Pigment Red 202 mixed crystal pigment, Ciba Specialty Chemicals)

NOVOPERM YELLOW 4G01 (C.I. Pigment Yellow 155 pigment, Clariant)
SPECIAL BLACK 250 (carbon black pigment, Ciba Specialty Chemicals)
SOLSPERSE 32000 (Noveon dispersant)
V-CAP (N-vinylcaprolactam, ISP)
SR285 (tetrahydrofurfuryl acrylate (THFA), Sartomer)
SR9003 (propylene glycol-modified neopentyl glycol diacrylate (PG-modified NPGDA), Sartomer)
SR506 (isobornyl acrylate, Sartomer)
SR531 (trimethylolpropane formal acrylate (CTFA), Sartomer)
SR395 (isodecyl acrylate, Sartomer)
SR339 (2-phenoxyethyl acrylate, Sartomer)
CN964 A85 (difunctional aliphatic urethane acrylate, containing 15 wt % tripropylene glycol diacrylate, Sartomer)
FIRSTCURE ST-1 (polymerization inhibitor, mixture of tris (N-nitroso-N-phenylhydroxyamine) aluminum salt (10 wt %) and phenoxyethyl acrylate (90 wt %), Chem First)
LUCIRIN TPO (photopolymerization initiator, 2,4,6-trimethylbenzoyldiphenylphosphine oxide, BASF)
IRGACURE 184 (photopolymerization initiator, 1-hydroxycyclohexyl phenyl ketone, Ciba-Geigy Ltd.)
TEGORAD 2100 (silicone-based surfactant, Degussa)

Preparation of Cyan Mill Base C1, Phthalocyanine Pigment 300 parts by weight of IRGALITE BLUE GLVO, 620 parts by weight of SR339, and 80 parts by weight of SOLSPERSE 32000 were mixed by stirring, thus giving cyan mill base C1. Preparation of cyan mill base C1 was carried out by dispersing using a Motor Mill M50 disperser (Eiger Machinery, Inc.) with zirconia beads having a diameter of 0.65 mm at a peripheral speed of 9 m/s for 4 hours.

Preparation of Cyan Mill Base C2, Phthalocyanine Pigment 300 parts by weight of IRGALITE BLUE GLVO, 620 parts by weight of SR9003, and 80 parts by weight of SOLSPERSE 32000 were mixed by stirring, thus giving cyan mill base C2. Preparation of cyan mill base C2 was carried out by dispersing using a Motor Mill M50 disperser (Eiger Machinery, Inc.) with zirconia beads having a diameter of 0.65 mm at a peripheral speed of 9 m/s for 4 hours.

Preparation of Magenta Mill Base M1 (C.I. Pigment Violet 19/C.I. Pigment Red 202 Mixed Crystal Pigment)

300 parts by weight of CINQUASIA MAGENTA RT355D, 600 parts by weight of SR339, and 100 parts by weight of SOLSPERSE 32000 were mixed by stirring, thus giving magenta mill base M1. Preparation of magenta mill base M1 was carried out by dispersing using a Motor Mill M50 disperser (Eiger Machinery, Inc.) with zirconia beads having a diameter of 0.65 mm at a peripheral speed of 9 m/s for 10 hours.

Preparation of Magenta Mill Base M2 (C.I. Pigment Violet 19/C.I. Pigment Red 202 Mixed Crystal Pigment)

300 parts by weight of CINQUASIA MAGENTA RT355D, 600 parts by weight of SR9003, and 100 parts by weight of SOLSPERSE 32000 were mixed by stirring, thus giving magenta mill base M2. Preparation of magenta mill base M2 was carried out by dispersing using a Motor Mill M50 disperser (Eiger Machinery, Inc.) with zirconia beads having a diameter of 0.65 mm at a peripheral speed of 9 m/s for 10 hours.

Preparation of Yellow Mill Base Y1 (C.I. Pigment Yellow 155)

300 parts by weight of NOVOPERM YELLOW 4G01, 600 parts by weight of SR339, and 100 parts by weight of SOLSPERSE 32000 were mixed by stirring, thus giving yellow mill base Y1. Preparation of yellow mill base Y1 was carried out by dispersing using a Motor Mill M50 disperser (Eiger Machinery, Inc.) with zirconia beads having a diameter of 0.65 mm at a peripheral speed of 9 m/s for 5 hours.

Preparation of Yellow Mill Base Y2 (C.I. Pigment Yellow 155)

300 parts by weight of NOVOPERM YELLOW 4G01, 600 parts by weight of SR9003, and 100 parts by weight of SOLSPERSE 32000 were mixed by stirring, thus giving yellow mill base Y2. Preparation of yellow mill base Y2 was carried out by dispersing using a Motor Mill M50 disperser (Eiger Machinery, Inc.) with zirconia beads having a diameter of 0.65 mm at a peripheral speed of 9 m/s for 5 hours.

Preparation of Black Mill Base K1 (Carbon Black)

300 parts by weight of SPECIAL BLACK 250, 620 parts by weight of SR339, and 80 parts by weight of SOLSPERSE 32000 were mixed by stirring, thus giving black mill base K1. Preparation of black mill base K1 was carried out by dispersing using a Motor Mill M50 disperser (Eiger Machinery, Inc.) with zirconia beads having a diameter of 0.65 mm at a peripheral speed of 9 m/s for 7 hours.

Preparation of Black Mill Base K2 (Carbon Black)

300 parts by weight of SPECIAL BLACK 250, 620 parts by weight of SR9003, and 80 parts by weight of SOLSPERSE 32000 were mixed by stirring, thus giving black mill base K2. Preparation of black mill base K2 was carried out by dispersing using a Motor Mill M50 disperser (Eiger Machinery, Inc.) with zirconia beads having a diameter of 0.65 mm at a peripheral speed of 9 m/s for 7 hours.

Method for Preparing Ink Composition

The materials described in Table 1 to Table 4 were mixed by stirring, thus giving the respective ink compositions.

TABLE 1

|  |  |  | Example | | | | | | | | | |
|---|---|---|---|---|---|---|---|---|---|---|---|---|
|  |  | Ink | C1 | C2 | C3 | C4 | C5 | C6 | C7 | C8 | C9 | C10 |
|  |  | Ink color | Cyan | Cyan | Cyan | Cyan | Cyan | Cyan | Cyan | Cyan | Cyan | Cyan |
| Pigment |  | Cyan pigment | 2.52 | 2.52 | 2.52 | 2.52 | 2.52 | 2.52 | 2.52 | 2.52 | 2.52 | 2.52 |
| Dispersant |  | SOLSPERSE 32000 | 0.672 | 0.672 | 0.672 | 0.672 | 0.672 | 0.672 | 0.672 | 0.672 | 0.672 | 0.672 |
| Monomer | Comp. A | N-Vinylcaprolactam | 14.5 | — | — | 14.5 | 14.5 | 14.5 | 14.5 | 14.5 | 14.5 | 5.5 |
|  |  | THFA | — | 14.5 | — | — | — | — | — | — | — | — |
|  |  | Phenoxyethyl acrylate | 9.6 | 9.6 | 25.6 | 9.6 | 9.6 | 9.6 | 9.6 | 42.35 | 37.35 | — |
|  | Comp. B | Isobornyl acrylate | 24.5 | 24.5 | 22 | 7 | 14 | 38 | 45 | 5 | 13 | — |
|  |  | CTFA | 26 | 26 | 27 | 43.5 | 36.5 | 7.5 | — | 12.71 | 9.71 | 60.5 |
|  | Other | PG-modified NPGDA | 5 | 5 | 5 | 5 | 5 | 5 | 5 | 5 | 5 | 13.6 |
|  |  | Isodecyl acrylate | — | — | — | — | — | 5 | 8.5 | — | — | — |

TABLE 1-continued

| | | | | | | | | | | | |
|---|---|---|---|---|---|---|---|---|---|---|---|
| Oligomer | CN964 A85 | 4.51 | 4.51 | 4.51 | 4.51 | 4.51 | 4.51 | 1.51 | 4.55 | 4.55 | 4.51 |
| Polymerization inhibitor | FIRSTCURE ST-1 (Al salt only) | 0.05 | 0.05 | 0.05 | 0.05 | 0.05 | 0.05 | 0.05 | 0.05 | 0.05 | 0.05 |
| Polymerization initiator | IRGACURE 184 | 3.5 | 3.5 | 3.5 | 3.5 | 3.5 | 3.5 | 3.5 | 3.5 | 3.5 | 3.5 |
| | LUCIRIN TPO | 9.15 | 9.15 | 9.15 | 9.15 | 9.15 | 9.15 | 9.15 | 9.15 | 9.15 | 9.15 |
| Surfactant | TEGORAD 2100 | — | — | — | — | — | — | — | — | — | — |
| Comp. A sum total (parts by weight) | | 24.1 | 24.1 | 25.6 | 24.1 | 24.1 | 24.1 | 24.1 | 56.85 | 51.85 | 5.5 |
| Comp. B sum total (parts by weight) | | 50.5 | 50.5 | 49 | 50.5 | 50.5 | 45.5 | 45 | 17.71 | 22.71 | 60.5 |
| Sum total of Comp. A and Comp. B (parts by weight) | | 74.60 | 74.60 | 74.60 | 74.60 | 74.60 | 69.60 | 69.10 | 74.56 | 74.56 | 66.00 |
| Total (parts by weight) | | 100 | 100 | 100 | 100 | 100 | 100 | 100 | 100 | 100 | 100 |

| | | Example | | | | | | Comparative Example | | | |
|---|---|---|---|---|---|---|---|---|---|---|---|
| Ink | | C11 | C12 | C13 | C14 | C15 | C16 | C20 | C21 | C22 | C23 |
| Ink color | | Cyan | Cyan | Cyan | Cyan | Cyan | Cyan | Cyan | Cyan | Cyan | Cyan |
| Pigment | Cyan pigment | 2.52 | 2.52 | 2.52 | 2.52 | 2.52 | 2.52 | 2.52 | 2.52 | 2.52 | 2.52 |
| Dispersant | SOLSPERSE 32000 | 0.672 | 0.672 | 0.672 | 0.672 | 0.672 | 0.672 | 0.672 | 0.672 | 0.672 | 0.672 |
| Monomer Comp. A | N-Vinylcaprolactam | 14.5 | 14.5 | 10 | 10 | 14.5 | 14.5 | 14.5 | — | 14.5 | 14.5 |
| | THFA | — | — | — | — | — | — | — | — | — | — |
| | Phenoxyethyl acrylate | 9.6 | 11.6 | 5.56 | 15.61 | 5.56 | 5.56 | 60.1 | — | 5.56 | 5.56 |
| Comp. B | Isobornyl acrylate | 26 | 15.5 | 20 | 16.15 | 27.35 | 27.45 | — | 32 | 10.1 | 37.29 |
| | CTFA | 24.5 | 14.79 | 20 | 42.29 | 27 | 27 | — | 38 | 14.44 | 31.5 |
| Other | PG-modified NPGDA | — | 20 | 9 | 3.21 | 5 | 5 | 5 | 9.6 | 5 | 3.21 |
| | Isodecyl acrylate | 5 | 3.21 | 15 | — | — | — | — | — | 30 | — |
| Oligomer | CN964 A85 | 4.51 | 4.51 | 4.55 | — | 4.55 | 4.55 | 4.51 | 4.51 | 4.51 | 0.05 |
| Polymerization inhibitor | FIRSTCURE ST-1 (Al salt only) | 0.05 | 0.05 | 0.05 | 0.05 | 0.05 | 0.05 | 0.05 | 0.05 | 0.05 | 0.05 |
| Polymerization initiator | IRGACURE 184 | 3.5 | 3.5 | 3.5 | 2.5 | 3.5 | 3.5 | 3.5 | 3.5 | 3.5 | 1.5 |
| | LUCIRIN TPO | 9.15 | 9.15 | 9.15 | 7 | 9.15 | 9.15 | 9.15 | 9.15 | 9.15 | 3.15 |
| Surfactant | TEGORAD 2100 | — | — | — | — | 0.03 | 0.01 | — | — | — | — |
| Comp. A sum total (parts by weight) | | 24.1 | 26.1 | 15.56 | 25.61 | 20.06 | 20.06 | 74.6 | 0 | 20.06 | 20.06 |
| Comp. B sum total (parts by weight) | | 50.5 | 30.29 | 40 | 58.44 | 54.35 | 54.45 | 0 | 70 | 24.54 | 68.79 |
| Sum total of Comp. A and Comp. B (parts by weight) | | 74.60 | 56.39 | 55.56 | 84.05 | 74.41 | 74.51 | 74.60 | 70.00 | 44.60 | 88.85 |
| Total (parts by weight) | | 100 | 100 | 100 | 100 | 100 | 100 | 100 | 100 | 100 | 100 |

TABLE 2

| | | Example | | | | | | | | | |
|---|---|---|---|---|---|---|---|---|---|---|---|
| Ink | | M1 | M2 | M3 | M4 | M5 | M6 | M7 | M8 | M9 | M10 |
| Ink color | | Magenta | Magenta | Magenta | Magenta | Magenta | Magenta | Magenta | Magenta | Magenta | Magenta |
| Pigment | Magenta pigment | 4.8 | 4.8 | 4.8 | 4.8 | 4.8 | 4.8 | 4.8 | 4.8 | 4.8 | 4.8 |
| Dispersant | SOLSPERSE 32000 | 1.6 | 1.6 | 1.6 | 1.6 | 1.6 | 1.6 | 1.6 | 1.6 | 1.6 | 1.6 |
| Monomer Comp. A | N-Vinylcaprolactam | 14.5 | — | — | 14.5 | 14.5 | 14.5 | 14.5 | 14.5 | 14.5 | 5.5 |
| | THFA | — | 14.5 | — | — | — | — | — | — | — | — |
| | Phenoxyethyl acrylate | 9.6 | 9.6 | 25.6 | 9.6 | 9.6 | 9.6 | 9.6 | 42.35 | 37.35 | — |
| Comp. B | Isobornyl acrylate | 24.5 | 24.5 | 22 | 7 | 14 | 38 | 45 | 5 | 13 | — |
| | CTFA | 26 | 26 | 27 | 43.5 | 36.5 | 7.5 | — | 12.71 | 9.71 | 60.5 |
| Other | PG-modified NPGDA | 1.79 | 1.79 | 1.79 | 1.79 | 1.79 | 1.79 | 1.79 | 1.79 | 1.79 | 10.39 |
| | Isodecyl acrylate | — | — | — | — | 5 | 8.5 | — | — | — | — |
| Oligomer | CN964 A85 | 4.51 | 4.51 | 4.51 | 4.51 | 4.51 | 4.51 | 1.51 | 4.55 | 4.55 | 4.51 |
| Polymerization inhibitor | FIRSTCURE ST-1 (Al salt only) | 0.05 | 0.05 | 0.05 | 0.05 | 0.05 | 0.05 | 0.05 | 0.05 | 0.05 | 0.05 |

TABLE 2-continued

| | | | | | | | | | | | |
|---|---|---|---|---|---|---|---|---|---|---|---|
| Polymerization initiator | IRGACURE 184 | 3.5 | 3.5 | 3.5 | 3.5 | 3.5 | 3.5 | 3.5 | 3.5 | 3.5 | 3.5 |
| | LUCIRIN TPO | 9.15 | 9.15 | 9.15 | 9.15 | 9.15 | 9.15 | 9.15 | 9.15 | 9.15 | 9.15 |
| Surfactant | TEGORAD 2100 | — | — | — | — | — | — | — | — | — | — |
| Comp. A sum total (parts by weight) | | 24.1 | 24.1 | 25.6 | 24.1 | 24.1 | 24.1 | 24.1 | 56.85 | 51.85 | 5.5 |
| Comp. B sum total (parts by weight) | | 50.5 | 50.5 | 49 | 50.5 | 50.5 | 45.5 | 45 | 17.71 | 22.71 | 60.5 |
| Sum total of Comp. A and Comp. B (parts by weight) | | 74.60 | 74.60 | 74.60 | 74.60 | 74.60 | 69.60 | 69.10 | 74.56 | 74.56 | 66.00 |
| Total (parts by weight) | | 100 | 100 | 100 | 100 | 100 | 100 | 100 | 100 | 100 | 100 |

| | | Example | | | | | | | Comparative Example | | |
|---|---|---|---|---|---|---|---|---|---|---|---|
| Ink | | M11 | M12 | M13 | M14 | M15 | M16 | M20 | M21 | M22 | M230 |
| Ink color | | Magenta | Magenta | Magenta | Magenta | Magenta | Magenta | Magenta | Magenta | Magenta | Magenta |
| Pigment | Magenta pigment | 4.8 | 4.8 | 4.8 | 4.8 | 4.8 | 4.8 | 4.8 | 4.8 | 4.8 | 4.8 |
| Dispersant | SOLSPERSE 32000 | 1.6 | 1.6 | 1.6 | 1.6 | 1.6 | 1.6 | 1.6 | 1.6 | 1.6 | 1.6 |
| Monomer Comp. A | N-Vinylcaprolactam | 14.5 | 14.5 | 10 | 10 | 14.5 | 14.5 | 14.5 | — | 14.5 | 14.5 |
| | THFA | — | — | — | — | — | — | — | — | — | — |
| | Phenoxyethyl acrylate | 9.6 | 11.6 | 5.56 | 15.61 | 5.56 | 5.56 | 60.1 | — | 5.56 | 5.56 |
| Comp. B | Isobornyl acrylate | 26 | 15.5 | 20 | 16.15 | 27.35 | 27.45 | — | 32 | 10.1 | 37.29 |
| | CTFA | 24.5 | 14.79 | 20 | 42.29 | 27 | 27 | — | 38 | 14.44 | 31.5 |
| Other | PG-modified NPGDA | — | 20 | 9 | — | 1.79 | 1.79 | 1.79 | 6.39 | 1.79 | — |
| | Isodecyl acrylate | 1.79 | — | 11.79 | — | — | — | — | — | 30 | — |
| Oligomer | CN964 A85 | 4.51 | 4.51 | 4.55 | — | 4.55 | 4.55 | 4.51 | 4.51 | 4.51 | 0.05 |
| Polymerization inhibitor | FIRSTCURE ST-1 (Al salt only) | 0.05 | 0.05 | 0.05 | 0.05 | 0.05 | 0.05 | 0.05 | 0.05 | 0.05 | 0.05 |
| Polymerization initiator | IRGACURE 184 | 3.5 | 3.5 | 3.5 | 2.5 | 3.5 | 3.5 | 3.5 | 3.5 | 3.5 | 1.5 |
| | LUCIRIN TPO | 9.15 | 9.15 | 9.15 | 7 | 9.15 | 9.15 | 9.15 | 9.15 | 9.15 | 3.15 |
| Surfactant | TEGORAD 2100 | — | — | — | — | 0.03 | 0.01 | — | — | — | — |
| Comp. A sum total (parts by weight) | | 24.1 | 26.1 | 15.56 | 25.61 | 20.06 | 20.06 | 74.6 | 0 | 20.06 | 20.06 |
| Comp. B sum total (parts by weight) | | 50.5 | 30.29 | 40 | 58.44 | 54.35 | 54.45 | 0 | 70 | 24.54 | 68.79 |
| Sum total of Comp. A and Comp. B (parts by weight) | | 74.60 | 56.39 | 55.56 | 84.05 | 74.41 | 74.51 | 74.60 | 70.00 | 44.60 | 88.85 |
| Total (parts by weight) | | 100 | 100 | 100 | 100 | 100 | 100 | 100 | 100 | 100 | 100 |

TABLE 3

| | | Example | | | | | | | | | |
|---|---|---|---|---|---|---|---|---|---|---|---|
| Ink | | Y1 | Y2 | Y3 | Y4 | Y5 | Y6 | Y7 | Y8 | Y9 | Y10 |
| Ink color | | Yellow | Yellow | Yellow | Yellow | Yellow | Yellow | Yellow | Yellow | Yellow | Yellow |
| Pigment | Yellow pigment | 4.8 | 4.8 | 4.8 | 4.8 | 4.8 | 4.8 | 4.8 | 4.8 | 4.8 | 4.8 |
| Dispersant | SOLSPERSE 32000 | 1.6 | 1.6 | 1.6 | 1.6 | 1.6 | 1.6 | 1.6 | 1.6 | 1.6 | 1.6 |
| Monomer Comp. A | N-Vinylcaprolactam | 14.5 | — | — | 14.5 | 14.5 | 14.5 | 14.5 | 14.5 | 14.5 | 5.5 |
| | THFA | — | 14.5 | — | — | — | — | — | — | — | — |
| | Phenoxyethyl acrylate | 9.6 | 9.6 | 25.6 | 9.6 | 9.6 | 9.6 | 9.6 | 42.35 | 37.35 | — |
| Comp. B | Isobornyl acrylate | 24.5 | 24.5 | 22 | 7 | 14 | 38 | 45 | 5 | 13 | — |
| | CTFA | 26 | 26 | 27 | 43.5 | 36.5 | 7.5 | — | 12.71 | 9.71 | 60.5 |
| Other | PG-modified NPGDA | 1.79 | 1.79 | 1.79 | 1.79 | 1.79 | 1.79 | 1.79 | 1.79 | 1.79 | 10.39 |
| | Isodecyl acrylate | — | — | — | — | 5 | 8.5 | — | — | — | — |
| Oligomer | CN964 A85 | 4.51 | 4.51 | 4.51 | 4.51 | 4.51 | 4.51 | 1.51 | 4.55 | 4.55 | 4.51 |
| Polymerization inhibitor | FIRSTCURE ST-1 (Al salt only) | 0.05 | 0.05 | 0.05 | 0.05 | 0.05 | 0.05 | 0.05 | 0.05 | 0.05 | 0.05 |

TABLE 3-continued

|  |  |  |  |  |  |  |  |  |  |  |
|---|---|---|---|---|---|---|---|---|---|---|
| Polymerization initiator | IRGACURE 184 | 3.5 | 3.5 | 3.5 | 3.5 | 3.5 | 3.5 | 3.5 | 3.5 | 3.5 |
|  | LUCIRIN TPO | 9.15 | 9.15 | 9.15 | 9.15 | 9.15 | 9.15 | 9.15 | 9.15 | 9.15 |
| Surfactant | TEGORAD 2100 | — | — | — | — | — | — | — | — | — |
| Comp. A sum total (parts by weight) |  | 24.1 | 24.1 | 25.6 | 24.1 | 24.1 | 24.1 | 24.1 | 56.85 | 51.85 | 5.5 |
| Comp. B sum total (parts by weight) |  | 50.5 | 50.5 | 49 | 50.5 | 50.5 | 45.5 | 45 | 17.71 | 22.71 | 60.5 |
| Sum total of Comp. A and Comp. B (parts by weight) |  | 74.60 | 74.60 | 74.60 | 74.60 | 74.60 | 69.60 | 69.10 | 74.56 | 74.56 | 66.00 |
| Total (parts by weight) |  | 100 | 100 | 100 | 100 | 100 | 100 | 100 | 100 | 100 | 100 |

|  |  |  | Example |  |  |  |  |  | Comparative Example |  |  |  |
|---|---|---|---|---|---|---|---|---|---|---|---|---|
|  | Ink |  | Y11 | Y12 | Y13 | Y14 | Y15 | Y16 | Y20 | Y21 | Y22 | Y23 |
|  | Ink color |  | Yellow | Yellow | Yellow | Yellow | Yellow | Yellow | Yellow | Yellow | Yellow | Yellow |
| Pigment | Yellow pigment |  | 4.8 | 4.8 | 4.8 | 4.8 | 4.8 | 4.8 | 4.8 | 4.8 | 4.8 | 4.8 |
| Dispersant | SOLSPERSE 32000 |  | 1.6 | 1.6 | 1.6 | 1.6 | 1.6 | 1.6 | 1.6 | 1.6 | 1.6 | 1.6 |
| Monomer | Comp. A | N-Vinylcaprolactam | 14.5 | 14.5 | 10 | 10 | 14.5 | 14.5 | 14.5 | — | 14.5 | 14.5 |
|  |  | THFA | — | — | — | — | — | — | — | — | — | — |
|  |  | Phenoxyethyl acrylate | 9.6 | 11.6 | 5.56 | 15.61 | 5.56 | 5.56 | 60.1 | — | 5.56 | 5.56 |
|  | Comp. B | Isobornyl acrylate | 26 | 15.5 | 20 | 16.15 | 27.35 | 27.45 | — | 32 | 10.1 | 37.29 |
|  |  | CTFA | 24.5 | 14.79 | 20 | 42.29 | 27 | 27 | — | 38 | 14.44 | 31.5 |
|  | Other | PG-modified NPGDA | — | 20 | 9 | — | 1.79 | 1.79 | 1.79 | 6.39 | 1.79 | — |
|  |  | Isodecyl acrylate | 1.79 | — | 11.79 | — | — | — | — | — | 30 | — |
| Oligomer | CN964 A85 |  | 4.51 | 4.51 | 4.55 | — | 4.55 | 4.55 | 4.51 | 4.51 | 4.51 | 0.05 |
| Polymerization inhibitor | FIRSTCURE ST-1 (Al salt only) |  | 0.05 | 0.05 | 0.05 | 0.05 | 0.05 | 0.05 | 0.05 | 0.05 | 0.05 | 0.05 |
| Polymerization initiator | IRGACURE 184 |  | 3.5 | 3.5 | 3.5 | 2.5 | 3.5 | 3.5 | 3.5 | 3.5 | 3.5 | 1.5 |
|  | LUCIRIN TPO |  | 9.15 | 9.15 | 9.15 | 7 | 9.15 | 9.15 | 9.15 | 9.15 | 9.15 | 3.15 |
| Surfactant | TEGORAD 2100 |  | — | — | — | — | 0.03 | 0.01 | — | — | — | — |
| Comp. A sum total (parts by weight) |  |  | 24.1 | 26.1 | 15.56 | 25.61 | 20.06 | 20.06 | 74.6 | 0 | 20.06 | 20.06 |
| Comp. B sum total (parts by weight) |  |  | 50.5 | 30.29 | 40 | 58.44 | 54.35 | 54.45 | 0 | 70 | 24.54 | 68.79 |
| Sum total of Comp. A and Comp. B (parts by weight) |  |  | 74.60 | 56.39 | 55.56 | 84.05 | 74.41 | 74.51 | 74.60 | 70.00 | 44.60 | 88.85 |
| Total (parts by weight) |  |  | 100 | 100 | 100 | 100 | 100 | 100 | 100 | 100 | 100 | 100 |

TABLE 4

|  |  |  | Example |  |  |  |  |  |  |  |  |  |
|---|---|---|---|---|---|---|---|---|---|---|---|---|
|  | Ink |  | K1 | K2 | K3 | K4 | K5 | K6 | K7 | K8 | K9 | K10 |
|  | Ink color |  | Black | Black | Black | Black | Black | Black | Black | Black | Black | Black |
| Pigment | Black pigment |  | 2.52 | 2.52 | 2.52 | 2.52 | 2.52 | 2.52 | 2.52 | 2.52 | 2.52 | 2.52 |
| Dispersant | SOLSPERSE 32000 |  | 0.672 | 0.672 | 0.672 | 0.672 | 0.672 | 0.672 | 0.672 | 0.672 | 0.672 | 0.672 |
| Monomer | Comp. A | N-Vinylcaprolactam | 14.5 | — | — | 14.5 | 14.5 | 14.5 | 14.5 | 14.5 | 14.5 | 5.5 |
|  |  | THFA | — | 14.5 | — | — | — | — | — | — | — | — |
|  |  | Phenoxyethyl acrylate | 9.6 | 9.6 | 25.6 | 9.6 | 9.6 | 9.6 | 9.6 | 42.35 | 37.35 | — |
|  | Comp. B | Isobornyl acrylate | 24.5 | 24.5 | 22 | 7 | 14 | 38 | 45 | 5 | 13 | — |
|  |  | CTFA | 26 | 26 | 27 | 43.5 | 36.5 | 7.5 | — | 12.71 | 9.71 | 60.5 |
|  | Other | PG-modified NPGDA | 5 | 5 | 5 | 5 | 5 | 5 | 5 | 5 | 5 | 13.6 |
|  |  | Isodecyl acrylate | — | — | — | — | 5 | 8.5 | — | — | — | — |
| Oligomer | CN964 A85 |  | 4.51 | 4.51 | 4.51 | 4.51 | 4.51 | 4.51 | 1.51 | 4.55 | 4.55 | 4.51 |
| Polymerization inhibitor | FIRSTCURE ST-1 (Al salt only) |  | 0.05 | 0.05 | 0.05 | 0.05 | 0.05 | 0.05 | 0.05 | 0.05 | 0.05 | 0.05 |

TABLE 4-continued

| | | | | | | | | | | | |
|---|---|---|---|---|---|---|---|---|---|---|---|
| Polymerization initiator | IRGACURE 184 | 3.5 | 3.5 | 3.5 | 3.5 | 3.5 | 3.5 | 3.5 | 3.5 | 3.5 | 3.5 |
| | LUCIRIN TPO | 9.15 | 9.15 | 9.15 | 9.15 | 9.15 | 9.15 | 9.15 | 9.15 | 9.15 | 9.15 |
| Surfactant | TEGORAD 2100 | — | — | — | — | — | — | — | — | — | — |
| Comp. A sum total (parts by weight) | | 24.1 | 24.1 | 25.6 | 24.1 | 24.1 | 24.1 | 24.1 | 56.85 | 51.85 | 5.5 |
| Comp. B sum total (parts by weight) | | 50.5 | 50.5 | 49 | 50.5 | 50.5 | 45.5 | 45 | 17.71 | 22.71 | 60.5 |
| Sum total of Comp. A and Comp. B (parts by weight) | | 74.60 | 74.60 | 74.60 | 74.60 | 74.60 | 69.60 | 69.10 | 74.56 | 74.56 | 66.00 |
| Total (parts by weight) | | 100 | 100 | 100 | 100 | 100 | 100 | 100 | 100 | 100 | 100 |

| | | Example | | | | | | Comparative Example | | | |
|---|---|---|---|---|---|---|---|---|---|---|---|
| | Ink | K11 | K12 | K13 | K14 | K15 | K16 | K20 | K21 | K22 | K23 |
| | Ink color | Black | Black | Black | Black | Black | Black | Black | Black | Black | Black |
| Pigment | Black pigment | 2.52 | 2.52 | 2.52 | 2.52 | 2.52 | 2.52 | 2.52 | 2.52 | 2.52 | 2.52 |
| Dispersant | SOLSPERSE 32000 | 0.672 | 0.672 | 0.672 | 0.672 | 0.672 | 0.672 | 0.672 | 0.672 | 0.672 | 0.672 |
| Monomer Comp. A | N-Vinylcaprolactam | 14.5 | 14.5 | 10 | 10 | 14.5 | 14.5 | 14.5 | — | 14.5 | 14.5 |
| | THFA | — | — | — | — | — | — | — | — | — | — |
| | Phenoxyethyl acrylate | 9.6 | 11.6 | 5.56 | 15.61 | 5.56 | 5.56 | 60.1 | — | 5.56 | 5.56 |
| Comp. B | Isobornyl acrylate | 26 | 15.5 | 20 | 16.15 | 27.35 | 27.45 | — | 32 | 10.1 | 37.29 |
| | CTFA | 24.5 | 14.79 | 20 | 42.29 | 27 | 27 | — | 38 | 14.44 | 31.5 |
| Other | PG-modified NPGDA | — | 20 | 9 | 3.21 | 5 | 5 | 5 | 9.6 | 5 | 3.21 |
| | Isodecyl acrylate | 5 | 3.21 | 15 | — | — | — | — | — | 30 | — |
| Oligomer | CN964 A85 | 4.51 | 4.51 | 4.55 | — | 4.55 | 4.55 | 4.51 | 4.51 | 4.51 | 0.05 |
| Polymerization inhibitor | FIRSTCURE ST-1 (Al salt only) | 0.05 | 0.05 | 0.05 | 0.05 | 0.05 | 0.05 | 0.05 | 0.05 | 0.05 | 0.05 |
| Polymerization initiator | IRGACURE 184 | 3.5 | 3.5 | 3.5 | 2.5 | 3.5 | 3.5 | 3.5 | 3.5 | 3.5 | 1.5 |
| | LUCIRIN TPO | 9.15 | 9.15 | 9.15 | 7 | 9.15 | 9.15 | 9.15 | 9.15 | 9.15 | 3.15 |
| Surfactant | TEGORAD 2100 | — | — | — | — | 0.03 | 0.01 | — | — | — | — |
| Comp. A sum total (parts by weight) | | 24.1 | 26.1 | 15.56 | 25.61 | 20.06 | 20.06 | 74.6 | 0 | 20.06 | 20.06 |
| Comp. B sum total (parts by weight) | | 50.5 | 30.29 | 40 | 58.44 | 54.35 | 54.45 | 0 | 70 | 24.54 | 68.79 |
| Sum total of Comp. A and Comp. B (parts by weight) | | 74.60 | 56.39 | 55.56 | 84.05 | 74.41 | 74.51 | 74.60 | 70.00 | 44.60 | 88.85 |
| Total (parts by weight) | | 100 | 100 | 100 | 100 | 100 | 100 | 100 | 100 | 100 | 100 |

Inkjet Recording Method

A recording medium was subjected to recording using head scanning type inkjet recording experimental equipment having a total of eight CA4 piezo type gray scale heads (Toshiba Tec Corporation), two for each color of cyan (C), magenta (M), yellow (Y), and black (K). An ink supply system comprised a main tank, a supply pipe, an ink supply tank immediately before an inkjet head, a filter, and an inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 45° C.±2° C. The piezo type inkjet head was driven so as to print in both directions with multisize dots of 6 to 42 pL at a resolution of 300×450 dpi or 600×450 dpi. The UV lamp employed SUB ZERO 085 H bulb lamp units manufactured by Integration Technology disposed at both ends of the head scanning unit. The distance between the centers of the inkjet heads was 3.2 cm for all of the eight, and the distance between the center of the lamp unit and the center of the closest inkjet head was 15 cm.

Among the lamps disposed at both ends, the lamp positioned to the rear with respect to the scanning direction (trailing lamp) was the lamp that first applied light to a landed inkjet droplet; with regard to this lamp, the lamp position, the main scan speed, and the discharge frequency were adjusted so that irradiation started within 0.7 seconds after ink landing on the recording medium, and with regard to the illumination intensity, this lamp was focused so that the irradiation intensity was 50 to 500 mW/cm$^2$ and the total integrated exposure was no greater than 40 mJ/cm$^2$. The time taken from landing to the first lamp irradiation could be adjusted by the shuttle scanning speed. The next exposure was carried out by the lamp (leading lamp) to the front with respect to the scanning direction (direction opposite to the above), and the lamp was focused so that the illumination intensity was 500 to 1,500 mW/cm$^2$ as an exposure surface illumination intensity. During this process, the integrated exposure was in the range of 25 to 70 mJ/cm$^2$. Setting was carried out so that a solid image could be drawn by a total of 4 head passes (bidirectional printing) in the case of 300 dpi and a total of 8 head passes (bidirectional printing) in the case of 600 dpi. Since the head was provided with two lamps, the total number of lamp passes was 4 for the leading lamp and 4 for the trailing lamp 4 in the case of 300 dpi, and 8 for the leading lamp and 8 for the trailing lamp in the case of 600 dpi. The value obtained by summing all integrated exposures during irradiation for each pass was calculated as the total integrated exposure. Furthermore, depending on the case, an additional exposure scan (scanning of lamp alone without discharging ink) was carried out as a post-cure after printing was completed.

A total of eight printed images were formed on coated paper (Oji Paper Co., Ltd.) with a size of 10 cm×10 cm; cyan 100% solid image, magenta 100% solid image, yellow 100% solid image, single color black 100% solid image, blue image (cyan 100% solid image+magenta 100% solid image), red image (yellow 100% solid image+magenta 100% solid image), green image (cyan 100% solid image+yellow 100% solid image), and 4 color black (cyan 100% solid image+yellow 100% solid image+magenta 100% solid image+single color black 100% solid image).

With regard to the exposure surface illumination intensity and the integrated exposure, a UV Power Map (EIT Instrumentation & Technology) was used, and the sum total of UVA, UVB, and UVC regions (a wavelength region of 240 to 400 nm) was used for the exposure surface illumination intensity and the integrated exposure.

Evaluation of Saturation

Hue measurement (D65 light source, viewing angle 2°) was carried out by means of a SpectroEye (Gretag) using an image obtained by the above-mentioned inkjet recording method. The measurement was carried out 24 hours after printing. As an index for relative comparison of color saturation, the $((a^*)^2+(b^*)^2)^{1/2}$ value was calculated. The larger the value, the higher the saturation.

Evaluation of Image Reflection Color Density

Reflection color density measurement (D65 light source, viewing angle 2°) was carried out by means of a SpectroEye (Gretag) using an image obtained by the above-mentioned inkjet recording method. The measurement was carried out 24 hours after printing.

Evaluation of Surface Gloss

Measurement was carried out for an image obtained by the above-mentioned inkjet recording method using a surface gloss meter manufactured by Sheen Instruments Ltd. at a measurement angle of 60°. The measurement was carried out 24 hours after printing. The evaluation criteria were as follows.

6: a surface gloss of at least 60
5: a surface gloss of at least 50 but less than 60
4: a surface gloss of at least 40 but less than 50
3: a surface gloss of at least 30 but less than 40
2: a surface gloss of at least 20 but less than 30
1: a surface gloss of less than 20

Evaluation of Stripe Unevenness

The stripe unevenness of an image obtained by the above-mentioned inkjet image recording method was evaluated by eye from a position 2 m away from the image. The evaluation criteria were as follows. The examination was carried out 24 hours after printing.

3: stripe unevenness could not be clearly seen by eye.
2: slight stripe unevenness could be seen by eye.
1: stripe unevenness could be clearly seen by eye.

Evaluation of Curability

The degree of tackiness of an image obtained by the above-mentioned inkjet recording method was evaluated by touch using the criteria below. Examination by touch was carried out immediately after printing.

3: there was no tackiness on the image.
2: the image was slightly tacky, but uncured ink composition or cured film did not transfer to the hand.
1: the image was tacky, and some uncured ink composition or cured film transferred to the hand.

Method for Evaluation of Flexibility: Bending Test

In the present examples, as a method for evaluating the flexibility of a cured film, a bending test was carried out.

100% and 200% solid images were formed by the above-mentioned inkjet recording method and evaluation was carried out using the criteria below. The test was carried out 24 hours after printing.

3: no cracks occurred for 100% and 200% samples.
2: no cracks occurred for the 100% sample, but cracks occurred in the bent part of an image area for the 200% average film thickness sample.
1: cracks occurred in the bent part of an image area for both 100% and 200% average film thickness samples.

Examples 1 to 16 and Comparative Examples 1 to 4

Images were formed in accordance with the above-mentioned inkjet recording method using ink sets shown in Table 5 to Table 7 under the conditions below for the trailing lamp, leading lamp, and number of passes. The evaluation results are shown in Table 5 to Table 7.

Trailing lamp: focused so that the irradiation intensity (exposure surface illumination intensity) was 153 mW/cm² and the integrated exposure was no greater than 19 mJ/cm² on the recording medium from 1 pass. The time from ink discharge to irradiation with the lamp was set at 0.2 seconds.

Leading lamp: focused so that the irradiation intensity (exposure surface illumination intensity) was 1,202 mW/cm² and the integrated exposure was 49 mJ/cm² on the recording medium from 1 pass.

Drawing was carried out so that the same area could be drawn by 6 passes. Since the same area was irradiated 6 times with each of the trailing lamp and the leading lamp, the total integrated exposure from 1.0 second after the initial ink discharge and thereafter was 389 mJ/cm².

TABLE 5

| | Ink combination of ink set | | | | Performance evaluation | | | | | | | | | | | | |
| | | | | | Color saturation | | | | | | Reflection color density | | | | | | |
| | C | M | Y | K | C | M | Y | R | G | B | C | M | Y | K | R | G | B | 4K |
| --- | --- | --- | --- | --- | --- | --- | --- | --- | --- | --- | --- | --- | --- | --- | --- | --- | --- | --- |
| Ex. 1 | C1 | M1 | Y1 | K1 | 55 | 79 | 105 | 83 | 81 | 72 | 2.10 | 1.93 | 1.82 | 1.98 | 1.89 | 1.95 | 2.01 | 2.10 |
| Ex. 2 | C2 | M2 | Y2 | K2 | 54 | 78 | 104 | 83 | 80 | 71 | 2.09 | 1.92 | 1.82 | 1.97 | 1.88 | 1.95 | 2.03 | 2.08 |
| Ex. 3 | C3 | M3 | Y3 | K3 | 54 | 78 | 104 | 83 | 81 | 71 | 2.09 | 1.93 | 1.81 | 1.98 | 1.89 | 1.93 | 2.02 | 2.07 |
| Ex. 4 | C4 | M4 | Y4 | K4 | 53 | 77 | 99 | 80 | 79 | 70 | 1.85 | 1.87 | 1.69 | 1.79 | 1.73 | 1.90 | 1.92 | 2.00 |
| Ex. 5 | C5 | M5 | Y5 | K5 | 54 | 78 | 103 | 81 | 80 | 71 | 1.93 | 1.89 | 1.74 | 1.88 | 1.79 | 1.93 | 1.97 | 2.01 |
| Ex. 6 | C6 | M6 | Y6 | K6 | 54 | 80 | 107 | 84 | 83 | 72 | 2.10 | 1.93 | 1.82 | 1.98 | 1.89 | 1.95 | 2.01 | 2.10 |
| Ex. 7 | C7 | M7 | Y7 | K7 | 54 | 79 | 105 | 82 | 82 | 74 | 2.08 | 1.92 | 1.82 | 1.97 | 1.88 | 1.95 | 2.00 | 2.08 |
| Ex. 8 | C8 | M8 | Y8 | K8 | 52 | 74 | 93 | 80 | 79 | 70 | 1.79 | 1.86 | 1.68 | 1.73 | 1.74 | 1.80 | 1.88 | 1.87 |
| Ex. 9 | C9 | M9 | Y9 | K9 | 53 | 76 | 95 | 79 | 79 | 71 | 1.81 | 1.87 | 1.72 | 1.83 | 1.80 | 1.83 | 1.94 | 1.98 |
| Ex. 10 | C10 | M10 | Y10 | K10 | 55 | 80 | 104 | 82 | 80 | 72 | 2.09 | 1.93 | 1.81 | 1.96 | 1.90 | 1.97 | 2.00 | 2.10 |
| Ex. 11 | C11 | M11 | Y11 | K11 | 54 | 79 | 104 | 81 | 80 | 72 | 2.07 | 1.93 | 1.81 | 1.98 | 1.90 | 1.97 | 2.01 | 1.09 |
| Ex. 12 | C12 | M12 | Y12 | K12 | 55 | 80 | 104 | 82 | 79 | 72 | 2.09 | 1.92 | 1.80 | 1.97 | 1.90 | 1.98 | 2.01 | 2.08 |

TABLE 5-continued

| | Ink combination of ink set | | | | Performance evaluation | | | | | | | | | | | | | | |
|---|---|---|---|---|---|---|---|---|---|---|---|---|---|---|---|---|---|---|---|
| | | | | | Color saturation | | | | | | Reflection color density | | | | | | | | |
| | C | M | Y | K | C | M | Y | R | G | B | C | M | Y | K | R | G | B | 4K |
| Ex. 13 | C13 | M13 | Y13 | K13 | 52 | 77 | 98 | 80 | 78 | 70 | 1.83 | 1.86 | 1.70 | 1.79 | 1.74 | 1.90 | 1.91 | 1.98 |
| Ex. 14 | C14 | M14 | Y14 | K14 | 53 | 78 | 102 | 81 | 80 | 70 | 1.92 | 1.89 | 1.73 | 1.87 | 1.78 | 1.93 | 1.99 | 2.00 |
| Ex. 15 | C15 | M15 | Y15 | K15 | 52 | 75 | 93 | 79 | 78 | 70 | 1.80 | 1.87 | 1.68 | 1.72 | 1.73 | 1.79 | 1.89 | 1.88 |
| Ex. 16 | C16 | M16 | Y16 | K16 | 53 | 77 | 95 | 80 | 79 | 70 | 1.82 | 1.87 | 1.72 | 1.80 | 1.78 | 1.84 | 1.94 | 1.97 |
| Comp. Ex. 1 | C20 | M20 | Y20 | K20 | 50 | 73 | 90 | 76 | 75 | 64 | 1.70 | 1.45 | 1.47 | 1.40 | 1.49 | 1.45 | 1.43 | 1.49 |
| Comp. Ex. 2 | C21 | M21 | Y21 | K21 | 52 | 70 | 89 | 75 | 76 | 68 | 1.60 | 1.75 | 1.56 | 1.67 | 1.60 | 1.74 | 1.82 | 1.60 |
| Comp. Ex. 3 | C22 | M22 | Y22 | K22 | 49 | 69 | 80 | 70 | 70 | 60 | 1.67 | 1.40 | 1.50 | 1.54 | 1.50 | 1.40 | 1.45 | 1.30 |
| Comp. Ex. 4 | C23 | M23 | Y23 | K23 | 48 | 65 | 78 | 67 | 67 | 58 | 1.55 | 1.35 | 1.30 | 1.43 | 1.49 | 1.32 | 1.33 | 1.20 |

TABLE 6

| | Ink combination of ink set | | | | Performance evaluation | | | | | | | | | | | | | | |
|---|---|---|---|---|---|---|---|---|---|---|---|---|---|---|---|---|---|---|---|
| | | | | | Surface gloss | | | | | | | | Stripe unevenness | | | | | | |
| | C | M | Y | K | C | M | Y | K | R | G | B | 4K | C | M | Y | K | R | G | B | 4K |
| Ex. 1 | C1 | M1 | Y1 | K1 | 4 | 4 | 4 | 4 | 6 | 5 | 5 | 5 | 3 | 3 | 3 | 3 | 3 | 3 | 3 | 3 |
| Ex. 2 | C2 | M2 | Y2 | K2 | 4 | 4 | 4 | 4 | 6 | 5 | 5 | 5 | 3 | 3 | 3 | 3 | 3 | 3 | 3 | 3 |
| Ex. 3 | C3 | M3 | Y3 | K3 | 4 | 4 | 4 | 4 | 6 | 5 | 5 | 5 | 3 | 3 | 3 | 3 | 3 | 3 | 3 | 3 |
| Ex. 4 | C4 | M4 | Y4 | K4 | 3 | 3 | 4 | 3 | 5 | 4 | 4 | 4 | 3 | 3 | 3 | 3 | 3 | 3 | 3 | 3 |
| Ex. 5 | C5 | M5 | Y5 | K5 | 4 | 4 | 4 | 4 | 6 | 5 | 5 | 5 | 3 | 3 | 3 | 3 | 3 | 3 | 3 | 3 |
| Ex. 6 | C6 | M6 | Y6 | K6 | 4 | 4 | 4 | 4 | 6 | 5 | 5 | 5 | 3 | 3 | 3 | 3 | 3 | 3 | 3 | 3 |
| Ex. 7 | C7 | M7 | Y7 | K7 | 4 | 4 | 4 | 4 | 6 | 5 | 5 | 5 | 3 | 3 | 3 | 3 | 3 | 3 | 3 | 3 |
| Ex. 8 | C8 | M8 | Y8 | K8 | 3 | 3 | 3 | 4 | 5 | 4 | 4 | 5 | 3 | 3 | 3 | 3 | 3 | 3 | 3 | 3 |
| Ex. 9 | C9 | M9 | Y9 | K9 | 3 | 4 | 4 | 4 | 6 | 5 | 5 | 5 | 3 | 3 | 3 | 3 | 3 | 3 | 3 | 3 |
| Ex. 10 | C10 | M10 | Y10 | K10 | 4 | 4 | 4 | 4 | 6 | 5 | 5 | 5 | 3 | 3 | 3 | 3 | 3 | 3 | 3 | 3 |
| Ex. 11 | C11 | M11 | Y11 | K11 | 4 | 4 | 4 | 4 | 6 | 5 | 5 | 5 | 3 | 3 | 3 | 3 | 3 | 3 | 3 | 3 |
| Ex. 12 | C12 | M12 | Y12 | K12 | 4 | 4 | 4 | 4 | 6 | 5 | 5 | 5 | 3 | 3 | 3 | 3 | 3 | 3 | 3 | 3 |
| Ex. 13 | C13 | M13 | Y13 | K13 | 4 | 4 | 4 | 4 | 6 | 5 | 5 | 5 | 3 | 3 | 3 | 3 | 3 | 3 | 3 | 3 |
| Ex. 14 | C14 | M14 | Y14 | K14 | 4 | 4 | 4 | 4 | 6 | 5 | 5 | 5 | 3 | 3 | 3 | 3 | 3 | 3 | 3 | 3 |
| Ex. 15 | C15 | M15 | Y15 | K15 | 3 | 3 | 3 | 3 | 5 | 4 | 4 | 4 | 3 | 3 | 3 | 3 | 3 | 3 | 3 | 3 |
| Ex. 16 | C16 | M16 | Y16 | K16 | 3 | 3 | 3 | 3 | 5 | 4 | 4 | 4 | 3 | 3 | 3 | 3 | 3 | 3 | 3 | 3 |
| Comp. Ex. 1 | C20 | M20 | Y20 | K20 | 1 | 1 | 1 | 1 | 3 | 2 | 2 | 4 | 3 | 3 | 3 | 3 | 3 | 3 | 3 | 3 |
| Comp. Ex. 2 | C21 | M21 | Y21 | K21 | 2 | 2 | 2 | 2 | 4 | 3 | 3 | 2 | 2 | 2 | 3 | 2 | 2 | 2 | 2 | 2 |
| Comp. Ex. 3 | C22 | M22 | Y22 | K22 | 1 | 1 | 1 | 1 | 2 | 2 | 2 | 2 | 2 | 2 | 3 | 1 | 3 | 2 | 2 | 2 |
| Comp. Ex. 4 | C23 | M23 | Y23 | K23 | 1 | 1 | 1 | 1 | 1 | 1 | 1 | 1 | 2 | 2 | 2 | 1 | 2 | 2 | 2 | 1 |

TABLE 7

| | Ink combination of ink set | | | | Performance evaluation | | | | | | | | | | | | | | |
|---|---|---|---|---|---|---|---|---|---|---|---|---|---|---|---|---|---|---|---|
| | | | | | Curability | | | | | | | | Flexibility | | | | | | |
| | C | M | Y | K | C | M | Y | K | R | G | B | 4K | C | M | Y | K | R | G | B | 4K |
| Ex. 1 | C1 | M1 | Y1 | K1 | 3 | 3 | 3 | 3 | 3 | 3 | 3 | 3 | 3 | 3 | 3 | 3 | 3 | 3 | 3 | 3 |
| Ex. 2 | C2 | M2 | Y2 | K2 | 3 | 3 | 3 | 3 | 3 | 3 | 3 | 3 | 3 | 3 | 3 | 3 | 3 | 3 | 3 | 3 |
| Ex. 3 | C3 | M3 | Y3 | K3 | 3 | 3 | 3 | 3 | 3 | 3 | 3 | 3 | 3 | 3 | 3 | 3 | 3 | 3 | 3 | 3 |
| Ex. 4 | C4 | M4 | Y4 | K4 | 3 | 3 | 3 | 3 | 3 | 3 | 3 | 3 | 3 | 3 | 3 | 3 | 3 | 3 | 3 | 3 |
| Ex. 5 | C5 | M5 | Y5 | K5 | 3 | 3 | 3 | 3 | 3 | 3 | 3 | 3 | 3 | 3 | 3 | 3 | 3 | 3 | 3 | 3 |
| Ex. 6 | C6 | M6 | Y6 | K6 | 3 | 3 | 3 | 3 | 3 | 3 | 3 | 3 | 3 | 3 | 3 | 3 | 3 | 3 | 3 | 3 |
| Ex. 7 | C7 | M7 | Y7 | K7 | 3 | 3 | 3 | 3 | 3 | 3 | 3 | 3 | 3 | 3 | 3 | 3 | 3 | 3 | 3 | 3 |
| Ex. 8 | C8 | M8 | Y8 | K8 | 3 | 3 | 3 | 3 | 3 | 3 | 3 | 3 | 3 | 3 | 3 | 3 | 3 | 3 | 3 | 3 |
| Ex. 9 | C9 | M9 | Y9 | K9 | 3 | 3 | 3 | 3 | 3 | 3 | 3 | 3 | 3 | 3 | 3 | 3 | 3 | 3 | 3 | 3 |
| Ex. 10 | C10 | M10 | Y10 | K10 | 3 | 3 | 3 | 3 | 3 | 3 | 3 | 3 | 3 | 3 | 3 | 3 | 3 | 3 | 3 | 3 |
| Ex. 11 | C11 | M11 | Y11 | K11 | 3 | 3 | 3 | 3 | 3 | 3 | 3 | 3 | 3 | 3 | 3 | 3 | 3 | 3 | 3 | 3 |

TABLE 7-continued

| | Ink combination of ink set | | | | Performance evaluation | | | | | | | | | | | | | | |
|---|---|---|---|---|---|---|---|---|---|---|---|---|---|---|---|---|---|---|---|
| | | | | | Curability | | | | | | | | Flexibility | | | | | | |
| | C | M | Y | K | C | M | Y | K | R | G | B | 4K | C | M | Y | K | R | G | B | 4K |
| Ex. 12 | C12 | M12 | Y12 | K12 | 3 | 3 | 3 | 3 | 3 | 3 | 3 | 3 | 3 | 3 | 3 | 3 | 3 | 3 | 3 | 3 |
| Ex. 13 | C13 | M13 | Y13 | K13 | 3 | 3 | 3 | 3 | 3 | 3 | 3 | 3 | 3 | 3 | 3 | 3 | 3 | 3 | 3 | 3 |
| Ex. 14 | C14 | M14 | Y14 | K14 | 3 | 3 | 3 | 3 | 3 | 3 | 3 | 3 | 3 | 3 | 3 | 3 | 3 | 3 | 3 | 3 |
| Ex. 15 | C15 | M15 | Y15 | K15 | 3 | 3 | 3 | 3 | 3 | 3 | 3 | 3 | 3 | 3 | 3 | 3 | 3 | 3 | 3 | 3 |
| Ex. 16 | C16 | M16 | Y16 | K16 | 3 | 3 | 3 | 3 | 3 | 3 | 3 | 3 | 3 | 3 | 3 | 3 | 3 | 3 | 3 | 3 |
| Comp. Ex. 1 | C20 | M20 | Y20 | K20 | 3 | 3 | 3 | 3 | 3 | 3 | 3 | 3 | 3 | 3 | 3 | 3 | 3 | 3 | 3 | 3 |
| Comp. Ex. 2 | C21 | M21 | Y21 | K21 | 3 | 3 | 3 | 2 | 3 | 3 | 3 | 2 | 3 | 3 | 3 | 3 | 3 | 3 | 3 | 3 |
| Comp. Ex. 3 | C22 | M22 | Y22 | K22 | 2 | 2 | 2 | 1 | 2 | 2 | 2 | 1 | 3 | 3 | 3 | 3 | 3 | 3 | 3 | 3 |
| Comp. Ex. 4 | C23 | M23 | Y23 | K23 | 1 | 1 | 1 | 1 | 1 | 1 | 1 | 1 | 3 | 3 | 3 | 3 | 3 | 3 | 3 | 3 |

Examples 17 to 29 and Comparative Examples 5 to 10

Images were formed in accordance with the above-mentioned inkjet recording method using ink sets shown in Table 8 under the conditions shown Table 8 for the number of passes, the number of inkjet heads of each color, the trailing lamp, the leading lamp, and post-curing. The evaluation results are shown in Table 9 to Table 11.

Post-curing was carried out by reciprocating the trailing lamp and the leading lamp so as to apply the exposure shown in Table 8. Furthermore, while post-curing was being carried out, ink discharge was not carried out. In Example 29, post-curing corresponds to step (3) above.

TABLE 8

| | Ink combination of ink set | | | | No. of passes | No. of heads (each color) | Head operating speed [m/sec] | Exposure conditions Trailing lamp | | |
|---|---|---|---|---|---|---|---|---|---|---|
| | | | | | | | | Illumination intensity [mW/cm$^2$] | Integrated amount of light [mJ/cm$^2$] | Time from discharge to exposure [sec] |
| | C | M | Y | K | | | | | | |
| Ex. 1 | C1 | M1 | Y1 | K1 | 6 | 2 | 1 | 153 | 19 | 0.13-0.35 |
| Ex. 17 | C1 | M1 | Y1 | K1 | 6 | 2 | 1 | 55 | 9 | 0.13-0.35 |
| Ex. 18 | C1 | M1 | Y1 | K1 | 6 | 2 | 1 | 298 | 24 | 0.13-0.35 |
| Ex. 19 | C1 | M1 | Y1 | K1 | 6 | 2 | 1 | 489 | 29 | 0.13-0.35 |
| Ex. 20 | C1 | M1 | Y1 | K1 | 6 | 2 | 1 | 153 | 19 | 0.13-0.35 |
| Ex. 21 | C1 | M1 | Y1 | K1 | 6 | 2 | 1 | 153 | 19 | 0.13-0.35 |
| Ex. 22 | C1 | M1 | Y1 | K1 | 6 | 2 | 1 | 153 | 19 | 0.13-0.35 |
| Ex. 23 | C1 | M1 | Y1 | K1 | 6 | 2 | 1.2 | 153 | 16 | 0.10-0.29 |
| Ex. 24 | C1 | M1 | Y1 | K1 | 6 | 2 | 0.5 | 153 | 38 | 0.25-0.70 |
| Ex. 25 | C1 | M1 | Y1 | K1 | 2 | 4 | 1 | 153 | 19 | 0.13-0.35 |
| Ex. 26 | C1 | M1 | Y1 | K1 | 4 | 2 | 1 | 153 | 19 | 0.13-0.35 |
| Ex. 27 | C1 | M1 | Y1 | K1 | 8 | 2 | 1 | 153 | 19 | 0.13-0.35 |
| Ex. 28 | C1 | M1 | Y1 | K1 | 16 | 1 | 1 | 153 | 19 | 0.13-0.35 |
| Ex. 29 | C1 | M1 | Y1 | K1 | 6 | 2 | 1 | 153 | 19 | 0.13-0.35 |
| Comp. Ex. 5 | C1 | M1 | Y1 | K1 | 6 | 2 | 1 | 0 | 0 | — |
| Comp. Ex. 6 | C1 | M1 | Y1 | K1 | 6 | 2 | 1 | 30 | 6 | 0.13-0.35 |
| Comp. Ex. 7 | C1 | M1 | Y1 | K1 | 6 | 2 | 0.12 | 55 | 75 | 1.04-2.90 |
| Comp. Ex. 8 | C1 | M1 | Y1 | K1 | 6 | 2 | 1 | 600 | 24 | 0.13-0.35 |
| Comp. Ex. 9 | C1 | M1 | Y1 | K1 | 6 | 2 | 1 | 1250 | 50 | 0.13-0.35 |
| Comp. Ex. 10 | C1 | M1 | Y1 | K1 | 6 | 2 | 1 | 124 | 15 | 0.13-0.35 |

TABLE 8-continued

| | | Exposure conditions | | | | Total integrated amount of light per unit area of printed material [mJ/cm$^2$] |
|---|---|---|---|---|---|---|
| | | Leading lamp | | | Post-curing | |
| | Illumination intensity [mW/cm$^2$] | Integrated amount of light [mJ/cm$^2$] | Time from discharge to exposure [sec] | Illumination intensity [mW/cm$^2$] | Integrated amount of light [mJ/cm$^2$] | |
| Ex. 1 | 1202 | 49 | 3.5-3.8 | — | — | 408 |
| Ex. 17 | 1202 | 49 | 3.5-3.8 | — | — | 348 |
| Ex. 18 | 1202 | 49 | 3.5-3.8 | — | — | 438 |
| Ex. 19 | 1202 | 49 | 3.5-3.8 | — | — | 468 |
| Ex. 20 | 564 | 29 | 3.5-3.8 | — | — | 288 |
| Ex. 21 | 1202 | 49 | 3.5-3.8 | — | — | 408 |
| Ex. 22 | 2100 | 78 | 3.5-3.8 | — | — | 582 |
| Ex. 23 | 564 | 24 | 3.1-3.3 | — | — | 240 |
| Ex. 24 | 1202 | 98 | 8.0-8.5 | — | — | 816 |
| Ex. 25 | 1202 | 49 | 3.5-3.8 | 1,202 | 49 | 136 |
| Ex. 26 | 1202 | 49 | 3.5-3.8 | — | — | 272 |
| Ex. 27 | 1202 | 49 | 3.5-3.8 | — | — | 544 |
| Ex. 28 | 1202 | 49 | 3.5-3.8 | — | — | 1088 |
| Ex. 29 | 153 | 19 | 3.5-3.8 | 1,202 | 49 | 228 |
| Comp. Ex. 5 | 1202 | 49 | 3.5-3.8 | — | — | 294 |
| Comp. Ex. 6 | 1202 | 82 | 3.5-3.8 | — | — | 528 |
| Comp. Ex. 7 | 564 | 200 | 31.5-33.0 | — | — | 1650 |
| Comp. Ex. 8 | 1202 | 49 | 3.5-3.8 | — | — | 438 |
| Comp. Ex. 9 | 1202 | 49 | 3.5-3.8 | — | — | 594 |
| Comp. Ex. 10 | 124 | 15 | 3.5-3.8 | — | — | 180 |

TABLE 9

| | Performance evaluation | | | | | | | | | | | | | |
|---|---|---|---|---|---|---|---|---|---|---|---|---|---|---|
| | Color saturation | | | | | | Reflection color density | | | | | | | |
| | C | M | Y | R | G | B | C | M | Y | K | R | G | B | 4K |
| Ex. 1 | 55 | 79 | 105 | 83 | 81 | 72 | 2.10 | 1.93 | 1.82 | 1.98 | 1.89 | 1.95 | 2.01 | 2.10 |
| Ex. 17 | 56 | 80 | 105 | 83 | 81 | 72 | 2.10 | 1.94 | 1.81 | 2.00 | 1.90 | 1.94 | 2.10 | 2.04 |
| Ex. 18 | 53 | 79 | 102 | 83 | 79 | 70 | 1.96 | 1.90 | 1.76 | 1.88 | 1.80 | 1.92 | 1.96 | 1.99 |
| Ex. 19 | 54 | 78 | 100 | 81 | 79 | 70 | 1.90 | 1.88 | 1.71 | 1.78 | 1.73 | 1.89 | 1.92 | 1.97 |
| Ex. 20 | 55 | 79 | 105 | 83 | 81 | 72 | 2.10 | 1.93 | 1.82 | 1.99 | 1.89 | 1.94 | 1.99 | 2.10 |
| Ex. 21 | 55 | 79 | 104 | 83 | 81 | 72 | 2.09 | 1.93 | 1.81 | 1.98 | 1.89 | 1.94 | 2.01 | 2.09 |
| Ex. 22 | 55 | 79 | 105 | 83 | 80 | 72 | 2.10 | 1.92 | 1.82 | 1.97 | 1.89 | 1.95 | 1.98 | 2.10 |
| Ex. 23 | 53 | 79 | 100 | 80 | 78 | 70 | 1.93 | 1.80 | 1.74 | 1.80 | 1.79 | 1.88 | 1.89 | 1.80 |
| Ex. 24 | 56 | 81 | 106 | 80 | 81 | 72 | 2.11 | 1.94 | 1.82 | 2.01 | 1.90 | 1.95 | 2.10 | 2.10 |
| Ex. 25 | 55 | 80 | 106 | 83 | 81 | 73 | 2.10 | 1.93 | 1.84 | 1.98 | 1.96 | 2.02 | 2.10 | 2.10 |
| Ex. 26 | 54 | 79 | 105 | 82 | 81 | 72 | 2.10 | 1.92 | 1.82 | 1.98 | 1.89 | 1.95 | 2.01 | 2.10 |
| Ex. 27 | 55 | 78 | 105 | 81 | 81 | 72 | 2.10 | 1.93 | 1.82 | 1.95 | 1.90 | 1.93 | 2.00 | 2.05 |
| Ex. 28 | 53 | 77 | 100 | 80 | 79 | 69 | 1.94 | 1.89 | 1.75 | 1.89 | 1.82 | 1.88 | 1.96 | 1.97 |
| Ex. 29 | 56 | 80 | 105 | 80 | 81 | 72 | 2.11 | 1.95 | 1.81 | 2.01 | 1.90 | 1.94 | 2.09 | 2.11 |
| Comp. Ex. 5 | 57 | 82 | 107 | 85 | 82 | 72 | 2.15 | 2.01 | 1.87 | 2.05 | 1.99 | 2.00 | 2.13 | 2.16 |
| Comp. Ex. 6 | 54 | 78 | 103 | 84 | 80 | 72 | 2.12 | 1.94 | 1.85 | 1.98 | 1.90 | 1.98 | 2.01 | 2.12 |
| Comp. Ex. 7 | 55 | 79 | 104 | 84 | 81 | 72 | 2.11 | 1.94 | 1.84 | 1.99 | 1.90 | 1.97 | 2.00 | 2.08 |
| Comp. Ex. 8 | 52 | 72 | 91 | 75 | 76 | 68 | 1.61 | 1.78 | 1.59 | 1.69 | 1.60 | 1.73 | 1.83 | 1.70 |
| Comp. Ex. 9 | 45 | 70 | 85 | 72 | 71 | 63 | 1.60 | 1.45 | 1.43 | 1.49 | 1.50 | 1.46 | 1.54 | 1.60 |
| Comp. Ex. 10 | 52 | 73 | 95 | 78 | 77 | 69 | 1.71 | 1.81 | 1.61 | 1.72 | 1.74 | 1.75 | 1.81 | 1.65 |

TABLE 10

| | Performance evaluation | | | | | | | | | | | | | | | |
|---|---|---|---|---|---|---|---|---|---|---|---|---|---|---|---|---|
| | Surface gloss | | | | | | | | Stripe unevenness | | | | | | | |
| | C | M | Y | K | R | G | B | 4K | C | M | Y | K | R | G | B | 4K |
| Ex. 1 | 4 | 4 | 4 | 4 | 6 | 5 | 5 | 5 | 3 | 3 | 3 | 3 | 3 | 3 | 3 | 3 |
| Ex. 17 | 4 | 4 | 4 | 4 | 6 | 5 | 5 | 5 | 3 | 3 | 3 | 3 | 3 | 3 | 3 | 3 |
| Ex. 18 | 3 | 3 | 3 | 4 | 5 | 4 | 5 | 5 | 3 | 3 | 3 | 3 | 3 | 3 | 3 | 3 |
| Ex. 19 | 3 | 3 | 3 | 3 | 5 | 4 | 4 | 4 | 3 | 3 | 3 | 3 | 3 | 3 | 3 | 3 |
| Ex. 20 | 4 | 4 | 4 | 4 | 6 | 5 | 5 | 5 | 3 | 3 | 3 | 3 | 3 | 3 | 3 | 3 |
| Ex. 21 | 4 | 4 | 4 | 4 | 6 | 5 | 5 | 5 | 3 | 3 | 3 | 3 | 3 | 3 | 3 | 3 |
| Ex. 22 | 4 | 4 | 4 | 4 | 6 | 5 | 5 | 5 | 3 | 3 | 3 | 3 | 3 | 3 | 3 | 3 |
| Ex. 23 | 3 | 3 | 3 | 3 | 5 | 4 | 5 | 5 | 3 | 3 | 3 | 3 | 3 | 3 | 3 | 3 |
| Ex. 24 | 4 | 4 | 4 | 4 | 6 | 5 | 5 | 5 | 3 | 3 | 3 | 3 | 3 | 3 | 3 | 3 |
| Ex. 25 | 4 | 4 | 4 | 4 | 6 | 5 | 5 | 5 | 3 | 3 | 3 | 2 | 3 | 3 | 3 | 2 |
| Ex. 26 | 4 | 4 | 4 | 4 | 6 | 5 | 5 | 5 | 3 | 3 | 3 | 3 | 3 | 3 | 3 | 3 |
| Ex. 27 | 4 | 4 | 4 | 4 | 6 | 5 | 5 | 5 | 3 | 3 | 3 | 3 | 3 | 3 | 3 | 3 |
| Ex. 28 | 3 | 3 | 3 | 3 | 5 | 4 | 4 | 4 | 3 | 3 | 3 | 3 | 3 | 3 | 3 | 3 |
| Ex. 29 | 4 | 4 | 4 | 4 | 6 | 5 | 5 | 5 | 3 | 3 | 3 | 3 | 3 | 3 | 3 | 3 |
| Comp. Ex. 5 | 4 | 4 | 4 | 4 | 6 | 5 | 5 | 5 | 1 | 1 | 1 | 1 | 1 | 1 | 1 | 1 |
| Comp. Ex. 6 | 4 | 4 | 4 | 4 | 6 | 5 | 5 | 5 | 2 | 2 | 3 | 2 | 2 | 2 | 2 | 1 |
| Comp. Ex. 7 | 4 | 4 | 4 | 4 | 6 | 5 | 5 | 5 | 2 | 2 | 3 | 2 | 2 | 2 | 2 | 1 |
| Comp. Ex. 8 | 2 | 2 | 2 | 2 | 3 | 2 | 2 | 4 | 3 | 3 | 3 | 3 | 3 | 3 | 3 | 3 |
| Comp. Ex. 9 | 1 | 1 | 1 | 1 | 2 | 2 | 2 | 2 | 3 | 3 | 3 | 3 | 3 | 3 | 3 | 3 |
| Comp. Ex. 10 | 2 | 2 | 3 | 2 | 3 | 3 | 2 | 4 | 3 | 3 | 3 | 3 | 3 | 3 | 3 | 3 |

TABLE 11

| | Performance evaluation | | | | | | | | | | | | | | | |
|---|---|---|---|---|---|---|---|---|---|---|---|---|---|---|---|---|
| | Curability | | | | | | | | Flexibility | | | | | | | |
| | C | M | Y | K | R | G | B | 4K | C | M | Y | K | R | G | B | 4K |
| Ex. 1 | 3 | 3 | 3 | 3 | 3 | 3 | 3 | 3 | 3 | 3 | 3 | 3 | 3 | 3 | 3 | 3 |
| Ex. 17 | 3 | 3 | 3 | 3 | 3 | 3 | 3 | 3 | 3 | 3 | 3 | 3 | 3 | 3 | 3 | 3 |
| Ex. 18 | 3 | 3 | 3 | 3 | 3 | 3 | 3 | 3 | 3 | 3 | 3 | 3 | 3 | 3 | 3 | 3 |
| Ex. 19 | 3 | 3 | 3 | 3 | 3 | 3 | 3 | 3 | 3 | 3 | 3 | 3 | 3 | 3 | 3 | 3 |
| Ex. 20 | 3 | 3 | 3 | 3 | 3 | 3 | 3 | 3 | 3 | 3 | 3 | 3 | 3 | 3 | 3 | 3 |
| Ex. 21 | 3 | 3 | 3 | 3 | 3 | 3 | 3 | 3 | 3 | 3 | 3 | 3 | 3 | 3 | 3 | 3 |
| Ex. 22 | 3 | 3 | 3 | 3 | 3 | 3 | 3 | 3 | 3 | 3 | 3 | 3 | 3 | 3 | 3 | 3 |
| Ex. 23 | 3 | 3 | 3 | 2 | 3 | 3 | 3 | 2 | 3 | 3 | 3 | 3 | 3 | 3 | 3 | 3 |
| Ex. 24 | 3 | 3 | 3 | 3 | 3 | 3 | 3 | 3 | 3 | 3 | 3 | 3 | 3 | 3 | 3 | 3 |
| Ex. 25 | 3 | 3 | 3 | 3 | 3 | 3 | 3 | 3 | 3 | 3 | 3 | 3 | 3 | 3 | 3 | 3 |
| Ex. 26 | 3 | 3 | 3 | 3 | 3 | 3 | 3 | 3 | 3 | 3 | 3 | 3 | 3 | 3 | 3 | 3 |
| Ex. 27 | 3 | 3 | 3 | 3 | 3 | 3 | 3 | 3 | 3 | 3 | 3 | 3 | 3 | 3 | 3 | 3 |
| Ex. 28 | 3 | 3 | 3 | 3 | 3 | 3 | 3 | 3 | 3 | 3 | 3 | 3 | 3 | 3 | 3 | 3 |
| Ex. 29 | 3 | 3 | 3 | 3 | 3 | 3 | 3 | 3 | 3 | 3 | 3 | 3 | 3 | 3 | 3 | 3 |
| Comp. Ex. 5 | 3 | 3 | 3 | 3 | 3 | 3 | 3 | 3 | 3 | 3 | 3 | 3 | 3 | 3 | 3 | 3 |
| Comp. Ex. 6 | 3 | 3 | 3 | 3 | 3 | 3 | 3 | 3 | 3 | 3 | 3 | 3 | 3 | 3 | 3 | 3 |
| Comp. Ex. 7 | 3 | 3 | 3 | 3 | 3 | 3 | 3 | 3 | 3 | 3 | 3 | 3 | 3 | 3 | 3 | 3 |
| Comp. Ex. 8 | 3 | 3 | 3 | 3 | 3 | 3 | 3 | 3 | 3 | 3 | 3 | 3 | 3 | 3 | 3 | 3 |
| Comp. Ex. 9 | 3 | 3 | 3 | 3 | 3 | 3 | 3 | 3 | 3 | 3 | 3 | 3 | 3 | 3 | 3 | 3 |
| Comp. Ex. 10 | 2 | 2 | 2 | 1 | 2 | 2 | 2 | 1 | 3 | 3 | 3 | 3 | 3 | 3 | 3 | 3 |

As hereinbefore described, in Examples 1 to 29, printed materials having high color saturation, high reflection color density, high gloss, inconspicuous stripe unevenness, and excellent curability and flexibility were obtained.

In Comparative Examples 1, 2, 8, and 9, the color saturation, reflection color density, and gloss were low, and stripe unevenness was conspicuous. It is surmised that spreading while wet of a fired droplet was insufficient.

In Comparative Examples 3 and 4, the color saturation, reflection color density, and gloss were very low, and stripe unevenness was conspicuous. Furthermore, cured films were tacky. In both Comparative Examples 3 and 4, since fine creases were observed to form on the printed material surface, it is surmised that degradation in the color saturation, reflection color density, and gloss was caused due to light scattering. It is surmised that creases were formed as a result of the film being too soft in Comparative Example 3, in which the total content of Component A and Component B was no greater than 55 wt % relative to the entire weight of the ink, and as a result of there being too little initiator in Comparative Example 4, in which incomplete curing of the interior of the film in particular was caused, thereby causing a difference in curability between the surface and the interior.

In Comparative Examples 5 to 7, the color saturation, reflection color density, and gloss were good, but stripe unevenness was conspicuous. It is surmised that since the time before curing after firing a droplet was at least 1.0 second (Comparative Example 5 and 7) or the exposure illumination intensity within 1.0 second after firing a droplet was too low (Comparative Example 6), fixation of a fired droplet could not be carried out well, and interference between fired droplets occurred.

In Comparative Example 10, the illumination intensity of the exposure means in step (3) above was less than 500 mW/cm², sufficient curing was not carried out, and the printed material was therefore tacky. Furthermore, the resulting color saturation, reflection color density, and gloss were low. Since creases were observed to be formed in the printed material gradually over time, it is surmised that as a result of insufficient exposure, a state in which curing of the interior was incomplete was maintained, this being the main factor.

What is claimed is:

1. An inkjet recording method in which image formation is carried out by:

employing an ink set comprising at least a cyan ink, a magenta ink, a yellow ink, and a black ink;

the inks of each color comprising a polymerizable compound and a polymerization initiator;

the polymerizable compound in the inks of each color comprising (Component A) at least one type of polymerizable compound selected from the group consisting of an N-vinyllactam, a compound represented by Formula (1), and a compound represented by Formula (2), and (Component B) at least one type of polymerizable compound selected from the group consisting of a compound represented by Formula (3) and a compound represented by Formula (4);

the total content of Component A and Component B in the inks of each color being 55 to 85 wt % relative to the entire weight of the ink;

and discharge of the inks being repeated 2 to 16 times for the same area; the method comprising at least (1) a step of discharging an ink via a lamp-equipped inkjet head unit;

(2) a first exposure step of irradiating the discharged ink with actinic radiation by exposure means having an illumination intensity of at least 50 mW/cm² but less than 500 mW/cm² at a time between 0 and 1.0 second after ink discharge so that the integrated exposure for a wavelength region of 240 to 400 nm is no greater than 40 mJ/cm²; and (3) a second exposure step of irradiating the discharged ink with actinic radiation by exposure means having an illumination intensity of at least 500 mW/cm² after at least 1.0 second has passed after ink discharge so that the integrated exposure for a wavelength region of 240 to 400 nm is 20 to 250 mJ/cm²;

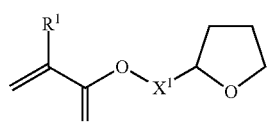

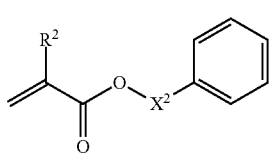

wherein in the Formula, $R^1$ and $R^2$ denote a hydrogen atom or a methyl group, and $X^1$ and $X^2$ denote a single bond or a divalent linking group,

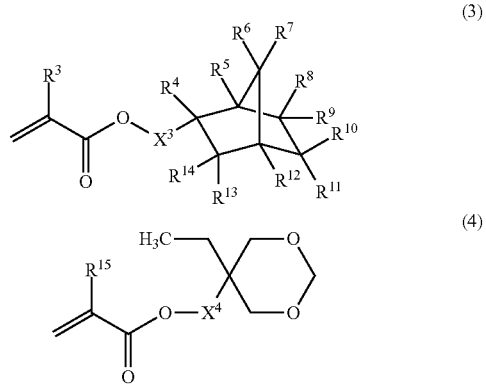

wherein in the Formula, $R^3$ and $R^{15}$ denote a hydrogen atom or a methyl group, $R^4$ to $R^{14}$ independently denote a hydrogen atom or an alkyl group, and $X^3$ and $X^4$ denote a single bond or a divalent linking group; and wherein ink discharged from the inkjet head unit is subjected to the first exposure step by means of a trailing lamp positioned to the rear of the inkjet head unit in the printing direction and subsequently, when the lamp-equipped inkjet head is operated in the printing direction opposite to the above, the discharged ink that has been subjected to the first exposure step is subjected to the second exposure step by means of a leading lamp positioned forward of the inkjet head unit in the printing direction.

2. The inkjet recording method according to claim 1, wherein image formation is carried out by repeating steps (1) to (3) above 2 to 16 times for the same area.

3. The inkjet recording method according to claim 1, wherein Component A in the inks of each color comprises an N-vinyllactam.

4. The inkjet recording method according to claim 3, wherein Component A in the inks of each color comprises an N-vinyllactam and a compound represented by Formula (2).

5. The inkjet recording method according to claim 1, wherein Component B in the inks of each color comprises a compound represented by Formula (4).

6. The inkjet recording method according to claim 5, wherein Component B in the inks of each color comprises a compound represented by Formula (3) and a compound represented by Formula (4).

7. The inkjet recording method according to claim 1, wherein the polymerization initiator in the inks of each color comprises an α-hydroxyketone compound and a monoacylphosphine oxide compound.

8. The inkjet recording method according to claim 1, wherein there are 2 to 4 inkjet heads for each color.

9. The inkjet recording method according to claim 1, wherein the total integrated exposure in a wavelength region of 240 to 400 nm, for the area onto which the ink is discharged, during a period of time from at least 1.0 sec after the ink is first discharged to completion of image formation is 300 to 1,500 mJ/cm².

10. The inkjet recording method according to claim 1, wherein the surface tension of the inks of each color is 31.0 to 39.0 mN/m.

11. The inkjet recording method according to any one of claims 1 to 10, wherein the content of polyfunctional (meth) acrylate compound in the inks of each color is 5 to 20 wt %.

12. The inkjet recording method according to claim 1, wherein the light sources used in step (2) above and step (3) above are light sources that have the same emission spectrum.

13. The inkjet recording method according to claim 4, wherein Component A in the inks of each color comprises an N-vinyllactam and a compound represented by Formula (2), and Component B in the inks of each color comprises a compound represented by Formula (3) and a compound represented by Formula (4).

14. The inkjet recording method according to claim 1, wherein the ink discharged in step (1) above is completely cured in step (2) above and step (3) above that are carried out the first time after discharge.

15. The inkjet recording method according to claim 2, wherein the image formation is carried out by repeating steps (1) to (3) above 2 to 16 times for the same area and the ink discharged each time in step (1) above is completely cured in step (2) above and step (3) above that are carried out the first time after discharge.

16. The inkjet recording method according to claim 1, wherein the image formation is carried out by a multipass method in which an image is formed by scanning the inkjet head by moving perpendicular to the recording medium transport direction and repeating a plurality of passes in accordance with the scan width to form dots.

17. The inkjet recording method according to claim 1, wherein the inks of each color further comprises an oligomer having a weight-average molecular weight of 400 to 10,000.

18. The inkjet recoding method according to claim 1, wherein the inks of each color further comprises a polymerization inhibitor.

\* \* \* \* \*